United States Patent [19]
Koloski et al.

[11] Patent Number: 5,977,241
[45] Date of Patent: Nov. 2, 1999

[54] POLYMER AND INORGANIC-ORGANIC HYBRID COMPOSITES AND METHODS FOR MAKING SAME

[75] Inventors: Timothy S. Koloski; Terrence G. Vargo, both of Kenmore, N.Y.

[73] Assignee: Integument Technologies, Inc., Jamestown, N.Y.

[21] Appl. No.: 08/833,290

[22] Filed: Apr. 4, 1997

Related U.S. Application Data

[60] Provisional application No. 60/039,258, Feb. 26, 1997.

[51] Int. Cl.$^6$ ................................. C08L 27/12; C08J 7/06
[52] U.S. Cl. ..................... 524/502; 524/403; 524/430; 524/431; 524/433; 524/439; 524/515; 524/520; 524/544; 524/546; 528/319.1; 528/319.3; 528/490; 528/502 R; 525/903
[58] Field of Search ..................... 524/403, 430, 524/433, 439, 520, 544, 546, 431, 515, 502; 428/319.1, 319.3; 525/903; 528/490, 502 R

[56] References Cited

U.S. PATENT DOCUMENTS

| | | | |
|---|---|---|---|
| 4,381,918 | 5/1983 | Ehrnford | 523/115 |
| 4,865,925 | 9/1989 | Ludwig et al. | 429/12 |
| 4,957,961 | 9/1990 | Chandrasekaran et al. . | |
| 4,975,495 | 12/1990 | Rossbach et al. . | |
| 5,010,128 | 4/1991 | Coltrain et al. . | |
| 5,094,892 | 3/1992 | Kayihan . | |
| 5,112,529 | 5/1992 | Saito | 528/490 |
| 5,115,023 | 5/1992 | Basil et al. . | |
| 5,190,698 | 3/1993 | Coltrain et al. . | |
| 5,208,638 | 5/1993 | Bujese et al. . | |
| 5,217,828 | 6/1993 | Sangyoji et al. . | |
| 5,284,714 | 2/1994 | Anderson et al. . | |
| 5,334,292 | 8/1994 | Rajeshwar et al. . | |
| 5,362,760 | 11/1994 | Bulters et al. | 521/54 |
| 5,366,544 | 11/1994 | Jones et al. . | |
| 5,380,584 | 1/1995 | Anderson et al. . | |
| 5,387,481 | 2/1995 | Radford et al. . | |
| 5,391,609 | 2/1995 | Knoerzer et al. . | |
| 5,405,583 | 4/1995 | Goswami et al. . | |
| 5,407,590 | 4/1995 | Salvia . | |
| 5,412,016 | 5/1995 | Sharp . | |
| 5,415,959 | 5/1995 | Pyszczek et al. . | |
| 5,420,313 | 5/1995 | Cunnington et al. . | |
| 5,439,785 | 8/1995 | Boston et al. . | |
| 5,468,498 | 11/1995 | Morrison et al. . | |
| 5,470,449 | 11/1995 | Bachot et al. . | |
| 5,474,857 | 12/1995 | Uchida et al. . | |
| 5,478,878 | 12/1995 | Nagaoka et al. . | |
| 5,492,769 | 2/1996 | Pryor et al. . | |
| 5,500,759 | 3/1996 | Coleman . | |
| 5,509,960 | 4/1996 | Simpson et al. . | |
| 5,512,389 | 4/1996 | Dasgupta et al. . | |
| 5,534,472 | 7/1996 | Winslow et al. . | |
| 5,536,583 | 7/1996 | Roberts et al. . | |
| 5,548,125 | 8/1996 | Sandbank . | |

FOREIGN PATENT DOCUMENTS

| 42 02 320 | 8/1993 | Germany . |
|---|---|---|
| WO 94/18264 | 8/1994 | WIPO . |

OTHER PUBLICATIONS

MacDiarmid et al., "Application of Thin Films of Conjugated Polymers in Novel LED's and Liquid Crystal Light Valves," *Proc. Materials Research Society Meeting*, Boston, MA (Nov. 1995).

Poliakoff et al., "Vibrational Spectroscopy in Supercritical Fluids: From Analysis and Hydrogen Bonding to Polymers and Synthesis,"*Angew. Chem. Int. Ed. Engl.*, 34:1275–1295 (1995).

Patchornik et al., "'Caging' of and Catalysis by a Complex Inside a Polymer Matrix," *J. Chem. Soc. Chem. Commun.*, 1090–1091 (1990).

Cooper et al., "Spectroscopic Probes for Hydrogen Bonding, Extraction Impregnation and Reaction in Supercritical Fluids," *Analyst*, 118:1111–1116 (1993).

Clarke et al., "Photochemical Generation of Polymer–Bound CpMn $(CO)_2(n^2-C=C)$ Complexes in Polyethylene Film: A Diagnostic Probe for Investigating the Unsaturation of the Polymer," *J. Am. Chem. Soc.*, 116:8621–8628 (1994).

Howdle et al., "Spectroscopic Analysis and In Situ Monitoring of Impregnation and Extraction of Polymer Films and Powders Using Supercritical Fluids," *Journal of Polymer Science: Part B: Polymer Physics*, 33:541–549 (1994).

Watkins et al., "Polymerization in Supercritical Fluid–Swollen Polymers: A New Route to Polymer Blends," *Macromolecules*, 27:4845–4847 (1994).

*Primary Examiner*—Andrew E. Merriam
*Attorney, Agent, or Firm*—Braman & Rogalskyj, LLP

[57] ABSTRACT

Composites which include a polymer matrix having natural free volume therein and an inorganic or organic material disposed in the natural free volume of the polymer matrix are disclosed. In addition, methods for making a composite are described. A polymer matrix having free volume therein is provided. The free volume is evacuated, and inorganic or organic molecules are infused into the evacuated free volume of the polymer matrix. The inorganic or organic molecules can then be polymerized under conditions effective to cause the polymerized inorganic or organic molecules to assemble into macromolecular networks. Alternatively, where the polymer matrix contains a functionality, the inorganic or organic molecules can be treated underconditions effective to cause the inorganic or organic molecules to interact with the polymer matrix's functionality. Use of the disclosed composites as photoradiation shields and filters, electromagnetic radiation shields and filters, antistatic layers, heterogeneous catalytic substrates, conducting electrodes, materials having flame and heat retardant properties, and components in the construction of electrolytic cells, fuel cells, and optoelectronic devices is also described.

98 Claims, No Drawings

POLYMER AND INORGANIC-ORGANIC HYBRID COMPOSITES AND METHODS FOR MAKING SAME

The present application claims the benefit of U.S. Provisional Patent Application Ser. No. 60/039,258, filed Feb. 26, 1997.

FIELD OF THE INVENTION

The present invention relates generally to composites and, more particularly, to polymer and inorganic-organic hybrid composites containing inorganic or organic materials disposed in the polymer matrix's free volume.

BACKGROUND OF THE INVENTION

Inorganic-organic hybrid materials have been used with varying degrees of success for a variety of applications.

In some of these materials, organic polymers are blended with inorganic fillers to improve certain properties of those polymers or to reduce the cost of the polymeric compositions by substituting cheaper inorganic materials for more expensive organic materials. Typically, inorganic fillers are either particulate or fibrous and are derived from inexpensive materials, such as naturally occurring minerals and glass. For example, U.S. Pat. No. 5,536,583 to Roberts et al. ("Roberts") describes methods for mixing inorganic ceramic powders into polyethersulfones, polyether ketones, and polyether ether ketones and methods for including metal nitrides, oxides, and carbides into fluoropolymer resins to produce corrosion inhibiting coatings as well as coatings which have improved abrasion resistance and/or enhanced bonding characteristics. U.S. Pat. No. 5,492,769 to Pryor et al. ("Pryor") describes methods for embedding metal or ceramic materials into organic polymeric materials to increase the polymer's abrasion resistance. U.S. Pat. No. 5,478,878 to Nagaoka et al. ("Nagaoka") describes a thermoplastic blend of an organic polymer and inorganic metallic fillers which improves the polymer's resistance to discoloration upon exposure to ambient light sources.

Each of the above inorganic-organic hybrid materials were made either (1) by melting and then mixing the inorganic and organic phases into a homogeneous mixture which was then cured, extracted, or dried or (2) by dissolving the polymer and inorganic material together in a solvent in which both materials were miscible, mixing to produce a homogeneous solution, and then evaporating the solvent to extract the hybrid material. The resulting inorganic-organic hybrid materials are essentially homogeneous macromolecular blends which have separate inorganic and organic domains which range from nanometers to tens of micrometers in size. All of the above composites are fabricated by using inorganic materials, typically naturally occurring minerals, which are in thermodynamically stable metallic forms, such as metal oxides, metal nitrides, and zero-valent metals.

These inorganic-organic hybrid materials suffer from a number of drawbacks which limit their utility. For example, the size of the domain that the inorganic materials assume within the hybrid depends on the particle size of the inorganic material particulate or fiber used in making the hybrid. In addition, the homogeneity of the inorganic-organic hybrid material largely depends on either the solubility of the inorganic material in the polymeric melt or on the solubility of the inorganic material in the solvent used to solubilize the polymeric material. Furthermore, the properties and molecular structures of these hybrids depend greatly on the methods used to extrude, cast, or dry the solid hybrid material from the melt or solubilized mixtures, which gives rise to significant, undesirable, and frequently uncontrollable batch-to-batch and regional variations.

Inorganic-organic hybrid materials have also been prepared by dispersing powdered or particulate forms of inorganic materials within various polymeric matrices.

For example, U.S. Pat. No. 5,500,759 to Coleman ("Coleman") discloses electrochromic materials made by dispersing electrically conductive metal particles into polymeric matrices; U.S. Pat. No. 5,468,498 to Morrison et al. ("Morrison") describes aqueous-based mixtures of colloidal vanadium oxide and dispersed sulfonated polymer which are useful for producing antistatic polymeric coatings; U.S. Pat. No. 5,334,292 to Rajeshwar et al. ("Rajeshwar") discloses conducting polymer films containing nanodispersed inorganic catalyst particles; and U.S. Pat. No. 5,548,125 to Sandbank ("Sandbank") discloses methods for melt- or thermo-forming flexible polymeric gloves containing particulate tungsten which makes the gloves useful for shielding x-radiation.

Although the inorganic-organic hybrid materials are homogeneously mixed, they contain separate inorganic and organic phases on a macromolecular scale. These separate phases frequently gives rise to the inorganic material's migration within and/or leaching out of the polymeric matrix. Furthermore, the inorganic phases of these inorganic-organic hybrid materials can be separated from the polymer matrix by simple mechanical processes or by solvent extraction of the polymer. Consequently, upon exposure to certain temperatures or solvents, the inorganic phases of these hybrids can migrate and dissipate out of or accumulate in various regions within the polymeric matrix, reducing its useful life.

Because of the problems associated with migration and leaching of the inorganic phase in inorganic-organic hybrids, hybrid materials containing inorganic phases having greater stability have been developed. These materials rely on physically entrapping large interpenetrating macromolecular networks of inorganic materials in the polymeric chains of the organic material.

For example, U.S. Pat. No. 5,412,016 to Sharp ("Sharp") describes polymeric inorganic-organic interpenetrating network compositions made by mixing a hydrolyzable precursor of an inorganic gel of Si, Ti, or Zr with an organic polymer and an organic carboxylic acid to form a homogeneous solution. The solution is then hydrolyzed, and the resulting hybrid materials are used to impart added toughness to conventional organic polymers as well as to increase their thermal stabilities and abrasion resistances. U.S. Pat. No. 5,380,584 to Anderson et al. ("Anderson I") describes an electrostatography imaging element which contains an electrically-conductive layer made of a colloidal gel of vanadium pentoxide dispersed in a polymeric binder. U.S. Pat. No. 5,190,698 to Coltrain et al. ("Coltrain I") describes methods for making polymer/inorganic oxide composites by combining a polymer derived from a vinyl carboxylic acid with a metal oxide in a solvent solution, casting or coating the resulting solution, and curing the resulting sample to form a composite of the polymer and the metal oxide. These composites are said to be useful for forming clear coatings or films having high optical density, abrasion resistance, or antistatic properties. U.S. Pat. No. 5,115,023 to Basil et al. ("Basil") describes siloxane-organic hybrid polymers which are made by hydrolytic condensation polymerization of organoalkyoxysilanes in the presence of organic film-forming polymers. The method is similar to that described in Sharp and, similarly, is used to improve a polymer's mechanical strength and stability while maintaining its flexibility and film forming properties. U.S. Pat. No. 5,010,128 to Coltrain et al. ("Coltrain II") describes methods for blending metal oxides with etheric polyphosphazenes to increase abrasion resistance and antistatic properties of polyphosphazene films. These methods, like those of Coltrain I, employ inorganic metal precursors which contain hydrolyzable leaving groups.

In each of the foregoing, the polymeric inorganic-organic interpenetrating network compositions are obtained by, sequentially, (1) adding hydrolyzable metals (or hydrolyzed metal gels) into either a polymer melt or a solvent containing a dissolved polymer; (2) adding a hydrolyzing agent or adjusting the pH of the solution to effect hydrolysis; (3) mixing; and (4) curing.

The methods described, however, suffer from several limitations. For example, they are limited to incorporating interpenetrating metal oxide networks into polymers which have similar solubilities as the hydrolyzable metal precursors or the hydrolyzed metal. In addition, because the method involves first mixing the inorganic hydrolyzable metal precursors or the hydrolyzed metal with the organic polymer and then curing the mixture, curing of the inorganic phase and organic phase necessarily occurs simultaneously. Since both the inorganic and organic materials are in intimate contact during the curing process, the organic phase of the resulting hybrid has physical characteristics different from that of the same polymer cured in the absence of an inorganic phase. This makes it difficult and, in many cases, impossible to predict the concentration of inorganic material necessary to preserve the desired properties of the starting organic polymer material or to predict the properties of the resulting hybrid. Typically, crystallinity and/or free volume in the hybrid materials are significantly different than the starting organic polymer materials cured in the absence of the inorganic phase. The methods also have limited utility because they provide no control over the spatial distribution of the inorganic and organic phases within the polymeric inorganic-organic interpenetrating network hybrid. For example, it is difficult and, in many cases, impossible to control which phase dominates the surface of the bulk material or the surface of the free volume within the bulk material. This variability can cause quality control problems as well as limit the usefulness of the hybrid materials.

Alternatively, it has been demonstrated that inorganic and organic molecules can be impregnated into solid matrices using supercritical fluids.

WO 94/18264 to Perman et al. describes the use of supercritical fluids for impregnating a variety of specific additives into polymer substrates by simultaneously contacting the polymer substrate with the impregnation additive and a carrier liquid, such as water, in the presence of a supercritical fluid. The described method requires that a polymeric material be simultaneously exposed to an impregnation additive and a carrier liquid, and, then, all three of these components are exposed to a supercritical fluid in a high pressure vessel for a sufficient time to swell the polymeric material so that the carrier liquid and impregnation additive can penetrate the swollen polymeric material.

In Clarke et al., *J. Am. Chem. Soc.*, 116:8621 (1994), supercritical fluid is used to impregnate polyethylene with $CpMn(CO)_3$ using supercritical $CO_2$ which acts to both solvate the $CpMn(CO)_3$ and to swell the polyethylene, thus permitting the flow of $CpMn(CO)_3$ into the free space created in the swollen polymer and into the free volume of the polymeric material.

Watkins et al., *Macromolecules*, 28:4067 (1995) discloses methods for polymerizing styrene in supercritical $CO_2$-swollen poly(chlorotrifluoroethylene) ("PCTFE").

Methods for impregnating polymeric materials with additives using supercritical fluids suffer from a number of important drawbacks. First, the method requires the use of a high pressure apparatus. Second, the method requires that the supercritical fluid or another suitable carrier solvent be available to solvate the additive to be impregnated in the polymer matrix. Third, the method requires that the polymeric material be grossly swollen to permit the additive to penetrate and, thus, to impregnate the polymeric material. This swelling results in large changes in the host polymer's surface and bulk morphology and also results in a lack of control of the final hybrid material's composition. Together, these changes and lack of control lead to a variety of physical and chemical changes in the host polymer, including changes in properties such as flexibility, crystallinity, and thermal characteristics. Finally, in most cases where supercritical methods are used to impregnate additives into polymeric materials, the impregnated additive can be readily diffused out of the polymeric material by exposure of the polymeric material to supercritical fluid conditions or, in some cases, to various solvents.

For these and other reasons, there remains a need for inorganic-organic polymer composites and for methods of preparing these inorganic-organic polymer composites which do not suffer from the above-described limitations. The present invention is directed to meeting this need.

SUMMARY OF THE INVENTION

The present invention relates to a composite. The composite includes a polymer matrix having a natural free volume therein and an inorganic or organic material disposed in the natural free volume of the polymer matrix.

The present invention also relates to a method for making a composite. A polymer matrix having free volume therein is provided. The free volume of the polymer matrix is evacuated, and inorganic or organic molecules are infused into the evacuated free volume of the polymer matrix. In a particularly preferred embodiment of the present invention, the inorganic or organic molecules are then polymerized under conditions effective to assemble the inorganic or organic molecules into macromolecular networks. In an alternative particularly preferred embodiment of the present invention, the polymer matrix comprises a functionality, and the inorganic or organic molecules are treated under conditions effective to cause the inorganic or organic molecules to interact with the polymer matrix's functionality.

The composites of the present invention contain polymeric phases which have physical properties substantially similar to the properties of the native polymer matrix (i.e., polymer matrix in the absence of inorganic or organic molecules or macromolecular networks). Consequently, the composites of the present invention, relative to conventional inorganic-organic hybrid materials, have significantly more predictable mechanical properties. The composites of the present invention also have controllable, predictable, and reproducible levels of optical densities and electrical, ionic, and charged species conductivities, which make them useful in various applications including photoradiation shields and filters, electromagnetic radiation shields and filters, heterogeneous catalytic substrates, and conducting electrodes. These characteristics also make these composites useful as components in the construction of electrolytic cells, fuel cells, optoelectronic devices, and materials having flame and heat retardant properties.

Although the initial formation of these composites results in materials having physical properties substantially similar to those of the native polymeric matrix, subsequent thermal, chemical, photochemical, or electrochemical treatment of the composites produced in accordance with the present invention can lead to improved physical properties. It is believed that these changes in the physical properties of the composite result from chemical and/or electronic interactions between the infused inorganic or organic molecules and the polymer matrix.

DETAILED DESCRIPTION OF THE INVENTION

The present invention relates to a composite. The polymer composite includes a polymer matrix which has natural free volume therein and an inorganic or organic material disposed in the natural free volume of the polymer matrix.

The polymer matrix can be an organic based polymer or an inorganic-organic hybrid polymer. Organic based polymers suitable for use in the composites of the present invention can be homopolymers, copolymers, multicomponent polymers, or combinations thereof. Suitable organic polymers include halopolymers, such as fluoropolymers and fluorochloropolymers, polyimides, polyamides, polyalkylenes, such as polyethylene, polypropylene, and polybutylene, poly(phenylenediamine terephthalamide) filaments, modified cellulose derivatives, starch, polyesters, polymethacrylates, polyacrylates, polyvinyl alcohol, copolymers of vinyl alcohol with ethylenically unsaturated monomers, polyvinyl acetate, poly(alkylene oxides), vinyl chloride homopolymers and copolymers, terpolymers of ethylene with carbon monoxide and with an acrylic acid ester or vinyl monomer, polysihoxanes, polyfluoroalkylenes, poly(fluoroalkyl vinyl ethers), homopolymers and copolymers of halodioxoles and substituted dioxoles, polyvinylpyrrolidone, or combinations thereof. Halopolymers are organic polymers which contain halogenated groups, such as fluoroalkyl, difluoroalkyl, trifluoroalkyl, fluoroaryl, difluoroalkyl, trifluoroalkyl, perfluoroalkyl, perfluoroaryl chloroalkyl, dichloroalkyl, trichloroalkyl, chloroaryl, dichloroalkyl, trichloroalkyl, perchloroalkyl, perchloroaryl, chlorofluoroalkyl, chlorofluoroaryl, chlorodifluoroalkyl, and dichlorofluoroalkyl groups. Halopolymers include fluorohydrocarbon polymers, such as polyvinylidine fluoride ("PVDF"), polyvinylflouride ("PVF"), polychlorotetrafluoroethylene ("PCTFE"), polytetrafluoroethylene ("PTFE") (including expanded PTFE ("ePTFE"). Fluoropolymers are preferred for many applications because of their extreme inertness, high thermal stability, hydrophobicity, low coefficients of friction, and low dielectric properties. In addition to retaining these desirable properties, in many applications, particularly catalytic applications, it is advantageous to utilize the highly electronegative characteristics of these fluoropolymers for enhancing the catalytic properties of metals by associating these metals with the fluoropolymers. Suitable fluoropolymers include perfluorinated resins, such as perfluorinated siloxanes, perfluorinated styrenes, perfluorinated urethanes, and copolymers containing tetrafluoroethylene and other perfluorinated oxygen-containing polymers like perfluoro-2,2-dimethyl-1,3-dioxide (which is sold under the trade name TEFLON-AF). Other polymers which can be used in the composites of the present invention include polytetrafluoroethylene-co-hexafluoropropylene, ethylenechlorotrifluoroethylene copolymer, and polyester based polymers, examples of which include polyethyleneterephthalates, polycarbonates, and analogs and copolymers thereof.

Polyphenylene ethers can also be employed. These include poly (2,6-dimethyl-1,4-phenylene ether), poly(2,6-diethyl-1,4-phenylene ether), poly(2-methyl-6-ethyl-1,4-phenylene ether), poly(2-methyl-6-propyl-1,4-phenylene ether), poly(2,6-dipropyl-1,4-phenylene ether), poly(2-ethyl-6-propyl-1,4-phenylene ether), poly(2,6-dibutyl-1,4-pheneylene ether), and the like.

Examples of suitable polyamides include polyhexamethylene adipamide (nylon 66), polyhexamethylene azelamide (nylon 69), polyhexamethylene sebacamide (nylon 610), polyhexamethylene dodecanoamide (nylon 612), poly-bis-(p-aminocyclohexyl) methane dodecanoamide, polytetramethylene adipamide (nylon 46) and polyamides produced by ring cleavage of a lactam such as polycaprolactam (nylon 6) and polylauryl lactam. Furthermore, there may be used polyamides produced by polymerization of at least two amines or acids used for the production of the abovementioned polymers, for example, polymers produced from adipic acid, sebacic acid and hexamethylenediamine. The polyamides further include blends of polyamides such as a blend of nylon 66 and nylon 6 including copolymers such as nylon 66/6.

Aromatic polyamides may also be used in the present invention. Preferably they are incorporated in copolyamides which contain an aromatic component, such as meltpolymerizable polyamides containing, as a main component, an aromatic amino acid and/or an aromatic dicarboxylic acid such as para-aminoethylb,enzoic acid, terephthalic acid, and isophthalic acid.

Typical examples of the thermoplastic aromatic copolyamides include copolymer polyamide of p-aminomethylbenzoic acid and ε-caprolactam (nylon AMBA/6), polyamides mainly composed of 2,2,4-/2,4,4-trimethylhexamethylene-diamineterephthalamide (nylon TMDT and Nylon TMDT/6I), polyamide mainly composed of hexamethylene diamineisophthalamide, and/or hexamethylenediamineterephthalamide and containing, as another component, bis(p-aminocyclohexyl)methaneisophthalamide and/or bis(p-aminocyclohexyl) methaneterephthalamide, bis (p-aminocyclohexyl)propaneisophthalamide and/or bis(p-aminocyclohexyl)propaneterephthalamide, (nylon 6I/PACM I, nylon 6I/DMPACM I, nylon 6I/PACP I, nylon 6I/6T/PACM I/PACM T, nylon 6I/6T/DMPACM I/DMPACM T, and/or nylon 6I/6T/PACP I/PACP T).

Styrene polymers can also be used. These include polystyrene, rubber modified polystyrene, styrene/acrylonitrile copolymer, styrene/methylmethacrylate copolymer, ABS resin, styrene/alphamethyl styrene copolymer, and the like.

Other suitable representative polymers include, for example, poly(hexamethylene adipamide), poly(ε-caprolactam), poly(hexamethylene phthalamide or isophthalamide), poly(ethylene terephthalate), poly (butylene terephthalate), ethylcellulose and methylcellulose, poly(vinyl alcohol), ethylene/vinyl alcohol copolymers, tetrafluoroethylene/vinyl alcohol copolymers, poly(vinyl acetate), partially hydrolyzed poly(vinyl acetate), poly (methyl methacrylate), poly(ethyl methacrylate), poly(ethyl acrylate), poly(methyl acrylate), ethylene/carbon monoxide/vinyl acetate terpolymers, ethylene/carbon monoxide/methyl methacrylate terpolymers, ethylene/carbon monoxide/n-butyl acrylate terpolymers, poly (dimethylsiloxane), poly(phenylmethylsiloxane), polyphosphazenes and their analogs, poly(heptafluoropropyl vinyl ether), homopolymers and copolymers of perfluoro(1,3-dioxole) and of perfluoro(2,2-dimethyl-1,3-dioxole), especially with tetrafluoroethylene and optionally with another ethylenically unsaturated comonomer, poly(ethylene oxide), poly(propylene oxide), and poly(tetramethylene oxide).

These and other suitable polymers can be purchased commercially. For example, poly(phenylenediamine terephthalamide) filaments can be purchased from Dupont under the tradename KEVLARTM. Alternatively, polymers suitable for the practice of the present invention can be prepared by well known methods, such as those described in Elias, *Macromolecules—Structure and Properties I and II*, New York:Plenum Press (1977) ("Elias"), which is hereby incorporated by reference.

The polymer matrix can, alternatively, be an inorganic-organic hybrid polymer or blend of organic polymer and inorganic-organic hybrid polymer. Inorganic-organic hybrid polymers suitable for the practice of the present invention include those prepared by conventional methods for making organic-inorganic hybrid materials, such as those described in Roberts, Pryor, Nagaoka, Coleman, Morrison, Rajeshwar, Sandbank, Sharp, Anderson I, Basil, and Coltrain I and II, which are hereby incorporated by reference.

The polymer matrix, in addition to an organic based polymer or an inorganic-organic hybrid polymer, can contain a variety of materials which are known in the art to modify the properties of the polymer matrix. These include, fillers, cross-linking agents, stabilizers, radical scavengers, compatabilizers, antistatic agents, dyes, and pigments. Their inclusion or exclusion will depend, of course, on the use to which the composite will be put, as will be apparent to one skilled in the art.

The materials which make up the polymer matrix, be they an organic polymer or an inorganic-organic hybrid material, contain natural free volume.

For purposes of this invention, free volume is used in a manner consistent with the description of free volume in Elias at pp. 186–188, which is hereby incorporated by reference. Briefly, Elias points out that, by definition, no extensive long-range order can exist in amorphous regions. Elias further notes that these amorphous regions are not x-ray crystalline, and, although studies suggest that x-ray amorphous polymers may have certain order, a definite number of vacant sites must be present. Thus, free volume, as used herein, relates to the vacant sites which are present in amorphous regions of a polymer matrix and into which organic or inorganic molecules can diffuse. The free volume is exploited in accordance with the present invention as regions into which inorganic or organic materials can be introduced, such as by diffusion, and subsequently assembled into macromolecular networks or stabilized through interaction with the polymer matrix's functionality. These free volumes generally form during the curing process, such as upon evaporation of the solvent in which the polymer was formed, but the present invention is not intended to be limited by the mechanism by which the free volume comes to exist in the polymer matrix.

For purposes of this invention, free volumes can be natural free volumes or created free volumes. Natural free volumes, as used herein, relates to the vacant sites which are characteristically present in amorphous regions of a polymer matrix and into which organic or inorganic molecules can diffuse These natural free volumes include those which are formed during the curing process, such as upon evaporation of the solvent in which the polymer was formed. In contrast, created free volumes are those free volumes which are produced or modified subsequent to the formation of the polymer matrix by exposing the polymer matrix to supercritical fluids under supercritical conditions. Since the free volumes of the composites of the present invention are natural free volumes and do not contain created free volumes, these natural free volumes contain substantially no carrier liquid or other solvent used in supercritical infusion processes.

The total natural free volume available for diffusing inorganic or organic molecules in a particular polymer matrix is dependent on a variety of characteristics of the natural free volume. These include the size, size distribution, concentration, and spatial distribution of the natural free volume, all of which are effected by the conditions under which the polymer matrix was formed, including, for example: how the solvent was removed; the pressure and temperature (and variations therein) during the solvent removal process; the degree to which the polymer was cured prior to onset of the solvent removal process; the nature of the solvent; the nature of the organic or inorganic-organic hybrid polymer; the size of the matrix; and the like. Another factor affecting the natural free volume of the polymer matrix is the degree of crystallinity. Polycrystalline regions contained within polymer matrix have less natural free volume than amorphous regions, are tightly packed, and inhibit movement of inorganic molecules into the polymer matrix. Thus, it is preferred that the polymer matrix have at least some degree of non-crystallinity (i.e., that it have a crystallinity of less than 100%). Suitable polymer matrices are those which have crystallinities of less than 99%, preferably less than 95%. The total natural free volume of the polymer matrix (i.e., the collective volume of the natural free volumes) ("$V_s$") is preferably greater that about $1 \times 10^{-6}$ of the total volume of the polymer matrix. Expressed differently, if the total volume of the polymer matrix is designated $V_c$, then the collective volume of the natural free volume is preferably greater than about $1 \times 10^{-6}$ $V_c$, more preferably from about $1 \times 10^{-6}$ $V_c$ to about 0.1 $V_c$, and still more preferably from about $1 \times 10^{-3}$ $V_c$ to about 0.1 $V_c$.

The natural free volume can be an inherent property of the polymer matrix (i.e., a property which is established by the method used to initially form the polymer matrix) or, alternatively, it can be controlled after formation of the polymer matrix by any suitable means (other than by exposure to supercritical fluids under supercritical conditions), such as by increasing or decreasing the temperature of the polymer matrix when the inorganic or organic materials are diffused thereinto. For example, increasing the temperature at which the inorganic or organic molecules are diffused into the polymer matrix increases the natural free volume of the polymer matrix without substantially altering its physical and mechanical properties. Thus, a greater concentration of the inorganic or organic molecules can be diffused into the polymer matrix, which results in, for example, a greater concentration of the macromolecular network in the polymer matrix.

Methods for determining the natural free volume as a fraction of the total polymer matrix volume (i.e., $V_s/V_c$) are well known to those skilled in the art. Illustrative methods can be found in Elias at pp. 256–259, which is hereby incorporated by reference. The polymer matrix's natural free volume can also be determined by the flow rate of gases through the polymer matrix. Natural free volume and its distribution in the polymer matrix can also be determined by using a photoreactive probe, such as the one described in Horie, "Dynamics of Electron-Lattice Interactions," in Tsuchida, ed., *Macromolecular Complexes: Dynamic Interactions and Electronic Processes*, New York:VCH Publishers, pp. 39–59 (1991), which is hereby incorporated by reference.

As indicated above, the composite of the present invention further includes an inorganic or organic material which is disposed in the polymer matrix's natural free volume. The amount of the inorganic or organic material within the natural free volume is typically proportionate to the internal surface area of the starting polymer matrix's natural free volume, which, as described above, can be an inherent characteristic of the polymer matrix or can be controlled by any suitable means (other than by exposure to supercritical conditions), for example, by increasing or decreasing the temperature at which the inorganic or organic material is diffused thereinto. The inorganic material can fill the polymer matrix's natural free volume or occupy a significant portion thereof in two or three dimensions. The inorganic material can itself form three dimensional networks within the polymer matrix's natural free volume. These three dimensional networks can be dense, substantially filling all the natural free volume, or they can be porous, thus permitting the flow of gas molecules into and out of the natural free volume and through the three dimensional inorganic or organic macromolecular network. Alternatively, the inorganic material can be a two-dimensional layer (such as a coating or film) on or along the surface or a portion of the surface of the natural free volume. In the case where the natural free volume is small, the inorganic or organic material may follow the one-dimensional template of the starting material. This results in a two-dimensional morphology depending on the inherent chemistry and/or the physical morphology at the natural free-volume/polymer matrix interfaces. Preferably, the inorganic or organic material is homogeneously or substantially homogeneously spread throughout the entire natural free volume of the polymer matrix.

Any suitable inorganic material can be employed. Preferred inorganic materials suitable for use in the practice of the present invention are those capable of having a vapor pressure greater than zero at a temperature between room temperature and the thermal decomposition temperature of the polymeric matrix material and/or at pressures of from about 0.1 mTorr to about 10 Torr. By inorganic material, it is meant that the material contains at least one metal ion or atom. As used herein, all atoms, other than hydrogen, oxygen, fluorine, chlorine. bromine, helium, neon, argon, krypton, xenon, and radon are considered to be metal atoms. Preferred metal atoms are the alkali metals, the alkaline earth metals, the transition elements, the lanthanides, the actinides, boron, aluminum, gallium, indium, thallium, silicon, germanium, tin, lead, phosphorous, arsenic, antimony, bismuth, selenium, tellurium, polonium, and astatine. In addition, carbon, nitrogen, sulfur, and iodine are considered metals, particularly in cases where they are bonded to other atoms via non-covalent bonds (e.g., ionic bonds and pi-pi bonds). Particularly useful inorganic materials are those which contain a metal selected from the group consisting of V, W, Fe, Ti, Si, Al, P, Sb, As, Ba, B, Cd, Ca, Ce, Cs, Cr, Co, Cu, Ga, Ge, En, Pb, Mg, Hg, Mo, Ni, Nb, Re, Ta, Tl, Sn, Ir, Rh, Th, Ru, Os, Pd, Pt, Zn, Au, Ag, and combinations thereof. Illustrative inorganic materials contemplated for use in the present invention also include metal ions or metal atoms which contain at least one active ligand. These metal ions or metal atoms which contain at least one active ligand can be polymerized to form a bond to a neighboring metal atom or ion, thereby forming a macromolecular complex, or they can be treated so that they interact with a functionality contained in the polymer matrix to form, for example, a metal species stabilized via complexation by the polymer matrix's functionality. Such metal ions or metal atoms include metallo-oxo species, metallonitro species, pi-allyl and arene complexes of Group IIIa, IVa, Va, VIa, VIIa, and VIIIa metals, and organo-metallo complexes ligated to organic functionalities like chlorides, bromides, alkyls, aryls, carboxylic acids, carbonyls, alkoxides, pyridines, tetrahydrofurans, and the like.

Preferably, the inorganic material is in the form of a macromolecular network or interacted with a functionality contained within the polymer matrix. The macromolecular networks and interacted inorganic materials are preferably stable to diffusion out of the polymer matrix at temperatures at which the composite is to be employed. For example, where the composite of the present invention is to be used as a catalyst, it is advantageous that the inorganic macromolecular network or inorganic material interacted with a functionality contained within the polymer matrix be stable to diffusion at temperatures employed in carrying out the particular catalytic reaction.

Suitable functionalities with which the inorganic material can interact include halogens (such as fluorines or chlorines), amines, alkenes, alkynes, carbonyls (such as keto groups, aldehyde groups, carboxylic acid groups, ester groups, amide groups, and the like), alcohols, and thiols. Inorganic molecules which are interacted with functionalities on the polymer matrix can have the formula $M^y$—$X_j$, where X is a functionality contained within the polymer matrix (e.g., halogen, such as F or Cl, $NH_2$, NH, O—C=O, C—OH, C=C, C≡C, or C=O), y is the oxidation state of the metal, which can range from zero to the highest oxidation state of the particular metal, and j is the number of ligands to which the particular metal can ligate within a given polymer matrix. For example, where M is Pd, and X is Cl, j can be 2.

Illustrative inorganic macromolecular networks which are stable to diffusion include metal atoms and macromolecular networks. Macromolecular networks, as used herein, are molecules containing three or more, preferably more than about 20, more preferably more than about 100, metal atoms that are directly or indirectly bonded together. Suitable macromolecular networks include polycondensates, such as those having the formula $[X(O)_n$—$O_y$—$X(O)_n]_m$, wherein m is an integer from about 1 to about 10,000; X represents a metal ion having a charge of +s; s is an integer from 1 to the metal's highest attainable oxidation state; y is an integer from 0 to s; and n is between zero and s/2. The well-known silica, titania, and zirconia structures, in which each metal atom is bonded to four oxygen atoms and each oxygen atom is bonded to two metal atoms, are examples of such macromolecular networks. Other macromolecular networks, such as those in which one or two of the bonds to some of the metal atoms in a silica, titania, or zirconia network are occupied by other moieties, such as alky,l groups, are also contemplated. Other macromolecular networks include those formed from pi-allyl compounds, such as pi-allyl compounds of Group IIIa, IVa, Va, VIa, VIIa, and VIIIa metals. Illustrative pi-allyl compounds suitable for use in the practice of the present invention are described, for example, in Wilke et al., *Angewandte Chemie, International Edition*, 5(2):151–266 (1996), which is hereby incorporated by reference. In particular, these compounds are contemplated as being useful for forming conductive zero-valent macromolecular metal networks (e.g. macro molecular networks of conducting metals in the zero oxidation states), such as those having the formula $-(M^o-M^o)_n$, wherein n is from about ½ to about 10,000 and $M^o$ is a Group IIIa, IVa, Va, VIa, VIIa, or VIIIa metal.

Any suitable organic material can also be employed. Preferred organic materials suitable for use in the practice of the present invention are those capable of having a vapor pressure greater than zero at a temperature between room temperature and the thermal decomposition temperature of the polymeric matrix material. It is preferred that they also be capable of polymerizing into a macromolecular network (e.g., macromolecular networks having the formula $-(R-R)_n$, wherein n is an integer from about 1 to about 10,000 and R is a monomer radical), such as through an oxidation, hydrolysis, chemical, electrochemical, or photochemical process. Organic molecules, such as pyrrole, aniline, and thiophene, that can be oxidatively polymerized, such as to form polypyrrole, polyaniline, and polythiophene, are suitable. Other suitable organic molecules are those which can be polymerized by exposure to actinic radiation (e.g., ultraviolet radiation), such as acetylene, which when polymerized forms polyacetylene. Still other illustrative organic molecules include organic monomers which can be converted to organic macromolecules, (i.e., polymers). These include the entire class of organic monomers which can be polymerized to form polymers, such as conducting polymers. A list of these materials, their properties, and their application to the construction of polymeric batteries, electric capacitors, electrochromic devices, transistors, solar cells, and non-linear optical devices and sensors can be found in: Yamamoto, "Macromolecular Complexes: Dynamic Interactions and Electronic Processes", in E. Tsuchida, ed., *Sequential Potential Fields in Electrically Conducting Polymers*, New York:VCH Publishers, pp. 379–396 (1991) ("Yamamoto"), which is hereby incorporated by reference.

Because of the close proximity of the polymer matrix and the inorganic or organic macromolecular network which exists within the natural free volume therein, the chemical functionality contained at the surface of the free volume within the polymer matrix can, in some instances, influence the chemical and electronic characteristics of the inorganic or organic macromolecular network and vice versa. Thus, by altering the polymer matrix, the properties of the inorganic or organic macromolecular network can be influenced. The degree of this influence depends on the nature of the chemistry and electronic properties of the starting polymer matrix. For example, strongly electron-withdrawing atoms, such as fluorine atoms, influence the catalytic properties of many metals. More particularly, Kowalak et al., *Collect. Czech.Chem. Commun*, 57:781–787 (1992), which is hereby incorporated by reference, reports that fluorinating zeolites containing polyvalent metal cations increases these zeolites' activity for inducing acid catalyzed reactions. Therefore, where the composites of the present invention are to be used for their catalytic properties, it can be advantageous to employ matrix materials bearing strongly electron-withdrawing groups. In some cases, the polymer matrix can contain pendant groups or chemical functionalities located at the free volume interface which can influence the chemical or electronic properties of the inorganic or organic macromolecular network formed in the free volume. The interactions of the pendant groups or chemical functionalities with the macromolecular network contained in the natural free volume can be via through-space interactions (i.e., no actual bond or complex formation between the interacting species), via direct ionic, hydrogen, or covalent bonding, or, in some cases, via the formation of a bond which is commonly found when metal atoms coordinate with non-metals or other metallic atoms or groups. The formation of such bonds between the polymer matrix material and the macromolecular network contained within the polymer matrix material's natural free volume can be detected using methods well known to those skilled in the art, such as ultraviolet-visible spectroscopy, infrared spectroscopy, X-ray photoelectron spectroscopy, nuclear magnetic resonance spectroscopy, and other techniques, including those described in Drago, *Physical Methods in Chemistry*, Philadelphia: W. B. Saunders (1977), which is hereby incorporated as reference.

One of the advantages of composites of the present invention is that the properties of the starting polymer matrix are substantially preserved. In contrast to the results obtained by supercritical impregnation methods (which have the effect of swelling the polymer matrix material), preferred composites of the present invention (e.g., composites which contain inorganic or organic macromolecular networks disposed in the natural free volume of a polymer matrix) have dimensions which are substantially equal to the dimensions of the starting polymer matrix (i.e., the polymer matrix whose natural free volume contains no inorganic or organic macromolecular networks disposed therein). Preferred composites of the present invention also have flexibility, crystallinity, or thermal decomposition temperatures ("Td") which are substantially the same as the flexibility, crystallinity, or Td of the starting polymer matrix. As used in this context, properties which differ by less than 10% are contemplated as being substantially the same. Td is described in Elias, *Macromolecules—Structure and Properties, I and II*, New York:Plenum Press (1977), which is hereby incorporated by reference. In other situations, it may be desirable to modify these properties so that they are different than those of the starting matrix material. This can be done by choosing an appropriate inorganic or organic molecule. Alternatively or additionally, this can be achieved by subsequent chemical, photochemical, electrochemical, or thermal treatments which can act to initiate interactions between the chemical functionalities of the infused organic or inorganic macromolecular network and the chemical functionalities found at the free volume surface of the polymer matrix. These interactions can lead to, for example, enhanced catalytic activity of metal species in the macromolecular network, enhanced thermal properties of the composite compared with the initial thermal properties of the starting polymer matrix, or enhanced conductivity of an organic conducting macromolecular network. To enhance the conductivity of organic conducting macromolecular networks, the macromolecular network can be doped, for instance, by the chemistry contained in the polymeric matrix material (especially the chemical functionalities of the polymer matrix at the free volume interface) or, alternatively, by a subsequent diffusion of dopant, whereby a dopant molecule is incorporated into the composite. Suitable dopants that can be used to enhance the conductivity of conducting macromolecular networks disposed in the composites of the present invention can be found, for example, in Yamamoto, which is hereby incorporated by reference.

Although, as indicated above, preferred inorganic materials are those which are resistant to diffusion, the present invention is not intended to be limited thereto. For example, the inorganic material can be a compound which can be converted, such as by chemical (e.g. oxidation, hydrolysis or hydrogenation), or electrochemical, photochemical, or thermal methods, to an inorganic macromolecular network or to a metal species interacted with the polymer matrix's functionality which resists diffusion. For example, the inorganic material can be a compound selected from the groups consisting of $VOCl_3$, $W(CO)_6$, $Fe(CO)_5$, $TiCl_4$, $SiCl_4$, $AlCl_3$, $PCl_3$, $SbCl_5$, $As(C_2H_5)_3$, $Ba(C_3H_7)_2$, borane pyridine and tetrahydrofuran complexes, $Cd(BF_4)_2$, $Ca(OOCCH(C_2H_5)C_4H_9)_2$, cerium (III), 2-ethylhexanoate, cesium 2-ethylhexoxide, chromium (III) naphthenate, $CrO_2Cl_2$, $Co(CO)_3NO$, copper (II) dimethylaminoethoxide, triethylgallium, $GeCl_4$, triethylindium, lead napthenate, $C_2H_5MgCl$, $(CH_3)_2Hg$, $MoF_6$, $Ni(CO)_4$, $Nb(OC_2H_5)_6$, $HReO_4$, $Ta(OC_2H_5)_5$, $C_5H_5Tl$, $SnCl_4$, pi-allyl compounds of Group IIIa, IVa, Va, VIa, VIIa, or VIIIa metals, and combinations thereof, all of which can be converted into inorganic materials which resist diffusion.

The polymer composites of the present invention can be prepared by the method which follows, to which the present invention also relates. A polymer matrix which has free volume therein is provided. The free volume is evacuated, and the evacuated free volume is infused with inorganic or organic molecules.

The free volume which is evacuated and into which the inorganic or organic molecules are infused can be natural free volumes (i.e., free volumes which are neither created nor modified by exposure of the polymer matrix to supercritical fluids under supercritical conditions prior to or during the evacuation or infusion).

Preferred inorganic molecules are those which can be converted into inorganic materials which are resistant to diffusion, such as inorganic molecules which can be polymerized into macromolecular networks or which can be treated so that the inorganic molecules interact with the polymer matrix's functionality. Suitable inorganic molecules include compounds and complexes of metal atoms (such as the alkali metals, the alkaline earths, the transition elements, the lanthanides, the actinides, boron, aluminum, gallium, indium, thallium, silicon, germanium, tin, lead, phosphorous, arsenic, antimony, bismuth, selenium, tellurium, polonium, and astatine, and, particularly in cases where they are bonded to other atoms via non-covalent bonds (e.g., ionic bonds and pi—pi bonds), carbon, nitrogen, sulfur, and iodine), especially V, W, Fe, Ti, Si, Al, P, Sb, As, Ba, B, Cd, Ca, Ce, Cs, Cr, Co, Cu, Ga, Ge, In, Pb, Mg, Hg, Mo, Ni, Nb, Re, Ta, Tl, Sn, Ir, Rh, Th, Ru, Os, Pd, Pt, Zn, Au, Ag, combinations thereof, and their ions. The ligands to which the metal atom or ion is bonded or complexed is not particularly critical, though it is preferred that the ligand be chosen so that the inorganic molecule be labile through exposure to oxidizing, hydrolyzing, hydrogenating, chemical, or electrochemical environments, as well as being labile through exposure to heat or actinic radiation, such as ultraviolet radiation. Suitable ligands include those disclosed above. Specific examples of inorganic molecules which can be used in the practice of the present invention include $VOCl_3$, $W(CO)_6$, $Fe(CO)_5$, $TiCl_4$, $SiCl_4$, $AlCl_3$, $PCl_3$, $SbCl_5$, $As(C_2H_5)_3$, $Ba(C_3H_7)_2$, borane pyridine and tetrahydrofuran complexes, $Cd(BF_4)_2$, $Ca(OOCCH(C_2H_5)C_4H_9)_2$, cerium (III), 2-ethylhexanoate, cesium 2-ethylhexoxide, chromium (III) naphthenate, $CrO_2Cl_2$, $Co(CO)_3NO$, copper (II) dimethylaminoethoxide, triethylgallium, $GeCl_4$, triethylindium, lead napthenate, $C_2H_5MgCl$, $(CH_3)_2Hg$, $MoF_6$, $Ni(CO)_4$, $Nb(OC_2H_5)_6$, $HReO_4$, $Ta(OC_2H_5)_5$, $C_5H_5Tl$, $SnCl_4$, pi-allyl compounds of Group IIIa, IVa, Va, VIa, VIIa, or VIIIa metals, and combinations thereof.

Suitable organic molecules are those which can be converted into polymeric materials which are resistant to diffusion, such as macromolecular networks. Suitable organic molecules include compounds such as, acetylene, p-phenylene, thiophene, 2,5-thienylene, pyrrole, 2,5-pyrrolylene, 3-substituted 2,5-thienylene, 3-substituted pyrrole, aniline, p-phenyl-enevinylene, 2,5-pyridinediyl, hexadiyne, and diaceytylenes. All of these compounds can be diffused into the polymer matrix and then oxidatively, chemically, or photochemically converted to their corresponding polymer so that they form a non-diffusible macromolecular network within the free volume of the polymer matrix. Since macromolecular networks made from these organic molecules can be electrically or ionically conducting, infusion of these organic molecules can add varying degrees of electrical and/or ionic properties to the composite material without significantly changing the crystallinity, flexibility, or Td of the starting polymer matrix material. Aromatic organic molecules, such as napthalenes and pyridines can also be infused to add optical properties to these materials. However, these aromatic materials cannot be polymerized into macromolecular networks and, therefore, are not as stable with respect to diffusion out of the polymer matrix, except in cases where they can complex with the polymer matrix's functionality.

As indicated above, the free volume of the polymer matrix is first evacuated. As used herein evacuating means reducing the pressure in the free volume of the polymer matrix to less than atmospheric pressure (i.e., less than 760 Torr). This can be carried out by placing the polymer matrix in a chamber, vessel, or other container capable of withstanding the vacuum being employed and reducing the pressure in the chamber, vessel, or other container to less than about 760 Torr, more preferably from about 100 Torr to about 10 mTorr or less, and most preferably from about 1 Torr to about 10 mTorr or less. Evacuation is typically achieved in from about 1 minute to about several days, depending on temperature and pressure.

The free volume, thus evacuated, is then infused with the inorganic or organic molecules. In contrast to the methods of the prior art, the infusion here is carried out under non-supercritical conditions (e.g., in the absence rather than in the presence of supercritical and carrier fluids, under conditions which do not produce created free volume and associated polymer swelling, and the like).

The infusion can be carried out by any practical method. Most conveniently, the infusion is carried out with the inorganic or organic molecule in a gaseous state by contacting the evacuated polymer matrix with the gaseous inorganic or organic molecule. The inorganic or organic molecule can be naturally in the gaseous state, as is the case with some of the metal carbonylss, or the inorganic or organic molecules can be boiled, sublimed, or otherwise vaporized, such as with heat or under reduced pressure or both. In many cases the inorganic or organic molecules will be at least somewhat reactive with the air; in these cases, vaporization, as well as all other manipulations of the inorganic or organic molecules, are best conducted in an inert atmosphere, such as under argon or nitrogen, or in a vacuum.

The gaseous inorganic or organic molecule is then contacted with the evacuated polymer matrix. This can be carried out by placing the polymer matrix into a vessel, evacuating the vessel to a pressure less than 760 Torr, and then flowing the gaseous inorganic or organic molecules into the evacuated vessel containing the evacuated polymer matrix. Infusion can be accelerated and, generally, more of the gaseous molecules can be infused by effecting the infusion process in a atmosphere of pure gaseous inorganic or organic molecules, preferably at elevated temperatures. The temperature and pressure at which the infusion is effected is important because they affect the time required for the infusion process. Temperature and pressure are preferably optimized within a range that allows the inorganic or organic materials to have vapor pressures of greater than zero and increases the concentration of amorphous regions within the polymer (which provides for more free volume).

It is believed that, by initially evacuating the vessel holding the polymer matrix, the rate of infusion of the inorganic or organic molecules is enhanced, because the inorganic or organic molecules do not need to displace ambient gases residing in the polymeric matrix's free volume.

In a preferred embodiment of the present invention, infusion is carried out at temperatures greater than about 50° C. below that of the polymer matrix's glass transition temperature ("Tg") and less than the thermal decomposition temperature ("Td") of the starting polymer matrix material (i.e., at temperatures greater than about Tg −50° C. but less than about Td). The greater the temperature, the greater the rate of incorporation of the inorganic or organic molecules infused into the polymer matrix. Also, the greater the temperature, the greater the resulting concentration of inorganic or organic material diffused into the polymer matrix due to thermal expansion which acts to increase the free volume within the polymer matrix. It is to be understood that these are only preferred conditions and that the same processes can be carried out outside of these preferred temperature ranges. In some cases, effecting infusion outside this temperature range may be preferred, such as to control the concentration of the inorganic or organic molecules in the finished composite. As the skilled practitioner will note, in order to practice the present invention in the preferred temperature range, the inorganic or organic molecule must have a non-zero vapor pressure at temperatures greater than about Tg −50° C. but less than about Td of the polymer matrix and/or at the pressure used during the infusion process. In some cases, heating the polymer matrix to temperatures which optimize free volume space may result in thermal decomposition of the inorganic or organic molecules one wishes to infuse into the polymer matrix. In such cases, infusion is best carried out at temperatures and pressures at which the inorganic or organic molecules can achieve a vapor pressure of greater than zero but not thermally decompose. As indicated above, the time required for infusion varies depending on the temperature, the pressure, the nature of the inorganic or organic molecules, the nature of the polymer matrix, the desired degree of infusion, the desired concentration of inorganic or organic molecules, and the like. In most circumstances, infusion can be effected in from about a few minutes to about 2 days.

After infusing the inorganic or organic molecules into the polymer matrix, the inorganic or organic molecules can be polymerized under conditions effective to cause the inorganic or organic molecules to assemble into macromolecular networks. Preferably, the polymerization is carried out in the absence of free (i.e., non-infused) inorganic or organic molecules. Consequently, it is preferred that, prior to polymerization, the infused polymer matrix be removed from the atmosphere containing gaseous inorganic or organic molecules or that the atmosphere surrounding the infused polymer matrix be evacuated or replaced with an inert gas.

Polymerization can be carried out by exposing the inorganic or organic molecules infused in the free volume of the polymer matrix to any suitable polymerizing condition. For example, the infused inorganic or organic material can be oxidized, hydrolyzed, hydrogenated, chemically treated, photoactivated, electrochemically polymerized, or thermally polymerized by exposing the infused inorganic or organic material to appropriate conditions, such as by exposing the infused inorganic or organic material to an oxidizing agent, a hydrolyzing agent, a hydrogenating agent, a specific chemical, actinic radiation, suitable voltages, or appropriate temperatures.

Typically, the oxidizing, hydrolyzing, or hydrogenating agent is gaseous or is contained in vapor form in an inert gas. For convenience, oxidation or hydrolysis can be effected by exposing the inorganic molecules to a gas which includes water, oxygen or combinations thereof, such as ambient air. The oxidation, hydrolysis, or hydrogenation can be carried out at any convenient temperature or pressure, preferably at room temperature and ambient pressure and at temperatures below the polymer matrix's Td and the inorganic or organic molecules decomposition temperature. In the case where the inorganic or organic molecules are air or moisture sensitive, oxidation or hydrolysis can be conveniently carried out at ambient pressure and temperature and in ambient air in from about 5 min to about 48 hours.

Hydrogenation can be carried out by exposing the infused polymer matrix to hydrogen gas. For example, a polymer matrix containing a metal pi-allyl compound can be placed in an atmosphere of hydrogen gas at room temperature for from about 5 minutes to about 48 hours. The pi-allyl compound is reduced, propane gas is released, and a stabilized metal species or a metal network is formed in the free volume of the polymer matrix. In the case where a metal network is formed in the polymer matrix's free volume, the metal network may or may not interact with functionalities contained within the polymer matrix.

In some cases polymerization can be carried our chemically. For example, organic molecules of pyrrole can be infused into the polymer matrix's free volume and then converted to polypyrrole by contacting the matrix material with a chemical solution containing 50% water and 50% $HNO_3$. This solution oxidizes the pyrrole to a macromolecular network of polypyrrole which resides throughout the free volume of the polymer matrix. Alternatively, the polymer matrix can be first converted to a composite as described herein such that the macromolecular network contained in the polymer matrix has oxidative properties. One suitable macromolecular network having oxidative properties is $V_2O_5$. After formation of this composite containing $V_2O_5$, organic molecules like pyrrole can be infused, which then are oxidized by the $V_2O_5$ macromolecular network to form a macromolecular polypyrrole network within the polymer matrix's free volume.

Organic monomers which can be electrochemically polymerized, such as acetylene or thiophene, once infused into the free volume of the polymer matrix, can be polymerized by contacting the infused polymer matrix with an electrode and adjusting the potential of the electrode to facilitate oxidative polymerization of the organic molecules.

As a further example, thermal treatment of the organic molecule $C_6H_4$—$CH_2$—$(R_2$-$S^+X^-)$—$CH_2$— facilitates polymerization to the macromolecular polymer polyphenylenevinylene. (See, for example, Yamamoto, which is hereby incorporated by reference.)

Once polymerized, the inorganic or organic molecules self-assemble into macromolecular networks over a period of time ranging from simultaneous assembly upon exposure to the polymerizing conditions to a few hours to a few days.

The assembled macromolecular network can, optionally, be infused with dopants, such as Na, $I_2$, $Br_2$, $FeCl_3$, $AlCl_3$, AsF$_5$, and those disclosed in Yamamoto, which is hereby incorporated by reference, to enhance the conductive properties of the macromolecular network contained within the free volume of the polymer matrix. Further description of these processes and their utility in making, for example, polymeric batteries, electrolytic capacitors, electrochromic devices, diodes, solar cells, and non-linear optic materials, can be found in Yamamoto, which is hereby incorporated by reference.

It is believed that, because the inorganic or organic molecules which are diffused into the polymer matrix are confined to the polymer matrix's free volume, the resulting self-assembled macromolecular networks are mainly limited to extending lengthwise (i.e., only a monolayer to a few layers of the network can form in two dimensions and the growth of the network is mainly through a one dimensional extension of a single monolayer chain through the interconnected free volumes contained within the polymer matrix). It is further believed that this results in a material whose polymer matrix phase is relatively unchanged with respect to flexibility, crystallinity, Td, and other physical properties. In essence, the polymer matrix is believed to act only as a molecular template into which the inorganic network is formed along the free volume space associated with these materials. However, since the inorganic or organic macromolecular network is contained in free volumes which are homogeneously incorporated throughout the polymer matrix, it imparts its own properties to the composite as a whole. Such imparted properties include controlled and varying optical densities, catalytic properties, and electrical and ionic conductivities, as well as enhanced thermal-mechanical properties.

Alternatively, particularly in cases where the polymer matrix contains a suitable functionality, the infused inorganic or organic molecules can be treated under conditions effective to cause the inorganic or organic molecules to interact with the polymer matrix's functionality. As described above, suitable polymer matrix functionalities include halogens (such as fluorines or chlorines), amines, alkenes, alkynes, carbonyls (such as keto groups, aldehyde groups, carboxylic acid groups, ester groups, amide groups, and the like), alcohols, and thiols. Inorganic molecules which are interacted with functionalities on the polymer matrix can have the formula M$^y$X$_j$, where X is a functionality contained within the polymer matrix (e.g., halogen, such as F or Cl, NH$_2$, NH, O—C=O, C—OH, C=C, C≡C, or C=O), y is the oxidation state of the metal, which can range from zero to the highest oxidation state of the particular metal, and j is the number of ligands to which the particular metal can ligate within a given polymer matrix. For example, where M is Pd, and X is Cl, j can be 2. In cases where the inorganic or organic molecules contain metal atoms or ions, the interacted metal and polymer matrix functionality can generally be characterized as an inorganic complex, although other types of interactions, such as covalent interactions, ionic interactions, pi—pi electronic interactions, and the like are also contemplated.

The interaction between the inorganic or organic material can be spontaneous, i.e., it can occur immediately or over a period of time simply by virtue of the inorganic or organic material being in close proximity with the polymer matrix's functionality. In this case, treating simply means permitting the inorganic or organic molecules to interact with the polymer matrix's functionality. In other cases, the interaction between the inorganic or organic material is not spontaneous and requires that the inorganic or organic molecules be actively treated, such as by oxidizing, hydrolyzing, hydrogenating, chemically treating, or photoactivating, electrochemically activating, the infused inorganic or organic molecules. The oxidized, hydrolyzed, hydrogenated, chemically treated, photoactivated, electrochemically activated inorganic or organic molecules then go on to interact with the functionality of the polymer matrix. In practicing this aspect of the present invention, oxidizing, hydrolyzing, hydrogenating, chemically treating, or photoactivating, electrochemically activating the infused inorganic or organic molecules can be carried out by the methods described above in regard to polymerizing the inorganic or organic molecules.

In some cases, most notably in the cases where the inorganic molecules contain metal atoms and ligands bonded thereto where the metal ligand bond strength is large, oxidation, hydrolysis, or hydrogenation of the ligands may be slow or incomplete. For comparisons of metal ligand bond strength and the tendency for metals to hydrolyze see Huheey, *Inorganic Chemistry, 3rd Edition, Principles of structure and reactivity*, New York:Harper and Row, Chapters 7 and 11, which is hereby incorporated by reference. In these cases, it is advantageous to expose the inorganic molecules to actinic radiation, such as ultraviolet ("UV") radiation, preferably a broad band source of about 190 nm to about 400 nm, (or, in some cases, high energy UV (e.g., wavelengths less than 190 nm) or x-radiation), under conditions effective to cleave the ligands from the metal atoms, typically for a period of time related to the strength of the metal ligand bond and the power output (i.e., power density) of the radiation source.

The metal atoms having the ligands cleaved therefrom can be treated photochemically, chemically, electrochemically, or thermally under conditions effective to cause the metal atoms to interact with the polymer matrix's functionality.

Alternatively, the metal atoms having the ligands cleaved therefrom can then be exposed to an oxygen or water containing gas under conditions effective to cause the metal atoms to assemble into macromolecular networks. An oxygen or water containing gas or atmosphere is preferably present while exposing the inorganic molecules (diffused into the polymer matrix) to actinic radiation, so that oxidation or hydrolysis can occur immediately upon cleavage of the ligand from the metal. Oxygen or water containing gases suitable for use in this process include: substantially pure oxygen; oxygen mixed with water and/or an inert gas, like Ar or N$_2$; or ambient air.

For example, W(CO)$_6$ is a tungsten metal complex which contains 6 carbonyl ligands. The carbonyl ligands are labile to heat or UV radiation. However, their lability decreases with the loss of each carbonyl ligand. In other words, upon loss of the first carbonyl, the second carbonyl becomes more difficult to remove; upon loss of the second carbonyl, the third carbonyl becomes more difficult to remove; and so on. Thus, after infusion of W(CO)$_6$ into a polymer matrix, loss of the carbonyl ligands is preferably carried out by activating the tungsten-carbonyl bond by exposure to a broad band ultraviolet source (e.g., radiation between 190 nm and 400 nm) to facilitate the total decomposition of the W(CO)$_6$. The decomposed tungsten complex is then free to interact with the polymer matrix's functionality or to react with neighboring decomposed tungsten complexes to form a macromolecular tungsten oxide network.

It is believed that the forgoing polymerization of the inorganic or organic molecules and assembly into macromolecular networks and/or the foregoing treatment of the inorganic or organic molecules to cause their interaction with the polymer matrix's functionality results in improved stability of the complex, such as, for example, by reducing migration of the inorganic or organic molecules out of the free volume of the polymer matrix.

The composites of the present invention are useful, for example, in the construction of lightweight, flexible, electromagnetic, UV and x-radiation shields; flexible components for use in the construction of electrochromic or liquid crystal based flat panel displays; and electrode and separator materials used in the construction of lightweight, high energy density batteries.

The composites of the present invention and composites produced in accordance with the method of the present invention, particularly those containing vanadium and oxygen, such as vanadium pentoxide, can be used as an electrically-conductive imaging layer of an electroconductive imaging element, such as those which are employed in high speed laser printing processes. The electroconductive imaging element typically includes an insulating support, an electrically-conductive layer overlaying the support, and a dielectric imaging layer overlaying the electrically-conductive layer. Further details regarding the construction and use of these electroconductive imaging elements can be found, for example, in Anderson I, which is hereby incorporated by reference.

The composites of the present invention and the composites made by the processes of the present invention, particularly those containing a vanadium oxide macromolecular network, can be used as antistatic materials in photographic elements, such as photographic films and papers. These photographic elements include a substrate, one or more light sensitive layers, and one or more anti-static layers containing the composite of the present invention. Other component layers, such as subbing layers, barrier layers, filter layers and the like can also be employed. A detailed description of photographic elements and their various layers and addenda can be found in, for example, James, *The Theory of the Photographic Process*, 4th ed. (1977), which is hereby incorporated by reference.

The present invention is also directed to a fuel cell, such as a battery. The fuel cell includes a composite of the present invention or a composite produced in accordance with the method of the present invention, particularly those that are electrically or ionically conductive. The fuel cell further includes an anode and a cathode which are in contact with the composite.

The present invention is also directed to a method for shielding a material from electromagnetic radiation emitted from an electromagnetic radiation source. The method includes disposing a composite of the present invention or a composite produced in accordance with the method of the present invention between the material to be shielded and the electromagnetic radiation source. Composites whose inorganic or organic molecule include a metal and liquid environment, such as those found in iron, titanium, and vanadium complexes, are particularly well suited for shielding visible and ultraviolet radiation. Composites whose inorganic or organic molecules include a metal having a high Z number, such as tungsten lead, and gold, also shield high-energy ultraviolet light and x-rays. As used herein, shielding is meant to include filtering, such as when the intensity of the electromagnetic radiation is partially reduced (e.g., by 50% or more), as well as blocking, such as when the electromagnetic radiation is completely absorbed by the composite.

The composites of the present invention can also be used as a flame or heat retardant material. More particularly, composites which contain a zinc oxide, a zinc/molybdenum oxide, a zinc/chromium oxide, a zinc/silicon oxide, a zinc/titanium oxide, a bismuth/boron oxide, a molybdenum/tin oxide, a molybdenum oxide, an antimony oxide, alumina, or silica macromolecular network or combinations thereof can be used in place of the fluoropolymer composition described in U.S. Pat. No. 4,957,961 to Chandrasekaren et al., which is hereby incorporated by reference, to thermally insulate wires and jacketing cables and to protect them from flames and smoke. Accordingly, the present invention is also directed to a method for shielding a material from heat or flame. The method includes disposing a composite of the present invention or a composite produced in accordance with the method of the present invention between the material to be shielded and the source of heat or flame. As used herein, the heat or flame source can be an actual heat or flame source or a potential heat or flame source.

In addition, the composites of the present invention which contain inorganic metallic networks known to be useful conventionally as catalysts for carrying out molecular transformations can be used for heterogeneous catalysis of, for example, flue gasses, car emissions, precursors to commercially valuable industrial grade and fine chemicals, and the like. The composites of the present invention are equally useful in batch as well as in continuous flow processes.

Catalyzing a reaction of a reactant using the composite of the present invention involves first providing a composite of the present invention wherein the inorganic material is suitable for catalyzing the reaction of the reactant and then contacting the composite with the reactant. Inorganic materials suitable for catalyzing reaction of particular reactants can be identified simply on the basis of known conventional catalysts for the particular reactant. For example, vanadium containing compounds, such as vanadium pentoxide, a well known conventional catalyst for the reaction of $SO_2$ to $SO_3$ with molecular oxygen, can be used as the inorganic material in the composite of the present invention to catalyze that reaction. Optimum reaction conditions for use of the composites of the present invention can be worked out for each individual reactant and inorganic material by methods well known in the art. Some reactions in which the composites of the present invention can serve as effective catalysts and procedures and apparatus suitable for carrying out catalysis using the present composites include those described in Patchornick et al., *J. Chem. Soc., Chem. Commun.*, 1990:1090 (1990) ("Patchornick"), U.S. Pat. No. 5,534,472 to Winslow et al. ("Winslow"), and U.S. Pat. No. 5,420,313 to Cunnington ("Cunnington") et al., which are hereby incorporated by reference.

Illustrative reactions which can be catalyzed with appropriate choice of inorganic or organic macromolecular network include: conversion of alkenes to epoxides using late transition metal complexes; conversion of alkenes to aldehydes using early transition metals such as titanium; selective oxidation of alcohols to aldehydes using late transition metals. Again, the efficiency of these and other reactions can be tuned by proper choice of metal and coordination environment, e.g., the surrounding ligands and steric encumberance of the surrounding polymer matrix.

As indicated above, transition metals, are particularly useful metals for incorporation into the composites of the present invention when these composites are to be used as catalysts. The unique characteristics of each transition metal for catalyzing different kinds of synthetic reactions should be considered. For example Fischer-Tropsch synthesis ("FTS") of hydrocarbons was stimulated in 1974, when the oil supply crisis relied heavily on the hydrogenation of CO to $CH_4$. The pattern of transition metals within the transition metal periods of the Periodic Table shows varying activities of these metals. A description of various transition metals and their utility for FTS is given in, for example, "Studies in Surface Science and Catalysis," vol. 79 in Moulijn et al., eds, *Catalysis, An Integrated Approach to Homogeneous, Heterogeneous and Industrial Catalysts*, Elsevier Science Publishers B. V. (1993) ("Moulijn"), which is hereby incorporated by reference. As a further example, the catalytic oxidation of sulphur dioxide and ammonia to produce sulfuric acid and nitric acid, respectively, are extremely important industrially based processes. Oxidative catalysis of ethylene and propylene epoxides and phthalic anhydrides among others are also examples of relevant industrially based catalytic conversions of alkanes by oxidative catalysis. An illustrative list of oxidative catalytic based syntheses of important industrial materials which can be catalyzed with the composites of the present invention is provided in Moulijn at p. 187, which is hereby incorporated by reference.

In many cases, it is desirable to swell the composite of the present invention during or before its use as a catalyst to increase the rate of diffusion of reactant into the composite. This can be carried out by exposing the composite to standard supercritical conditions. For example, the composite can be placed in a vessel capable of withstanding high pressures, such as the pressures commonly encountered in supercritical catalytic processes. The vessel is then charged with a supercritical fluid under supercritical conditions, such as carbon dioxide at 2500 psi, and the pressure is maintained for a period of time ranging from 1 to 100 hours. As a result of being exposed to these supercritical conditions, the composite swells. However, in contrast to the materials of the prior art in which impregnation is carried out under supercritical conditions, the inorganic or organic materials infused in accordance with the methods of the present invention do not diffuse out of the polymer matrix upon the composite's subsequent exposure to supercritical conditions.

The effectiveness of the composites of the present invention as heterogeneous catalysts is believed to be due to the residence of the inorganic material along the polymer structure that is at the surface of free volume and which is accessible to the gas phase molecules to be catalytically transformed. This is in contrast to conventional inorganic-organic blends where the mixing and blending procedures fail to control placement of the inorganic phase and where, in view of the surface free energy constraints, it is believed that mixing and curing procedures would likely lead to materials which would have little if any inorganic material at the surface of the free volume.

The present invention is further illustrated by the following examples.

EXAMPLES

Example 1

Preparation and Characterization of $V_2O_5$ in Polytetrafluoroethylene-co-hexafluoropropylene A 12"×2" piece of polytetrafluoroethylene-co-hexafluoropropylene, ("FEP") (Dupont), was wrapped around itself to form a loose fitting coil and then placed in a 100 ml round bottom flask. The flask was connected to a vacuum line and then pumped down to less than 10 mTorr pressure. Next, ca. 1 ml of $V(O)Cl_3$ (Strem) was vacuum transferred to the 100 ml round bottom flask. The flask was then closed and heated to ca. 75° C. under vacuum so that a gas phase of $V(O)Cl_3$ filled the entire volume of the flask for 1 hr. The flask was removed from the heat, and its temperature lowered to about room temperature. The $V(O)Cl_3$ was then vacuum transferred off the FEP polymer, and the 100 ml round bottom flask was opened to ambient air.

Upon opening the flask, the FEP polymer was transparent to the eye but, within a few minutes, began to turn yellow-orange and reached its darkest level after a few hours. X-Ray Photoelectron Spectroscopy ("XPS") indicated the formation of a highly oxidized vanadium complex, and the visible orange color was indicative of a large macromolecular $V_2O_5$ network. This was further confirmed by ultraviolet-visible spectroscopy ("UV-vis"). The broad absorbance spectrum had two major peaks around 370 nm (A=1.8) and 248 nm (A=3.2) and was similar to but different than that of pure $V_2O_5$ powder dissolved in acetonitrile. It is believed that the difference in the UV-vis spectra between the $V_2O_5$ formed in the FEP polymer and that in the acetonitrile solution is attributable to some electronic coordination of the vanadium metal center to adjacent fluorine functionality contained in the FEP. This is supported by the XPS results which measure an extremely high binding energy of about 518.5 eV, a full eV higher than that measured for the $V_2O_5$ powder. This increase in binding energy is consistent with the vanadium being in a highly electron withdrawing environment which further suggests that the vanadium is either directly bonded to or affected through space by the fluorine functionality contained in the FEP polymer. To further support this, the FEP polymer containing the vanadium was placed into a beaker containing 50% hydrofluoric acid ("HF") in water for 2 hrs. Upon removing the FEP material, it was observed that the material was totally transparent to the eye (i.e., no yellow color was observed). Inspection by UV-vis spectroscopy showed the absorbance band originally at 248 nm to be present (although it was blue shifted to a lower wavenumber) at approximately the same intensity. However, the band at 370 nm had disappeared. Since the band at 370 nm is attributed to intermolecular transitions and the band at 248 nm is attributed to intramolecular transitions, the results are consistent with a mechanism which preferentially coordinates the vanadium species to fluoride ions from the HF. This in turn breaks the coordination of the vanadium to the fluorine atoms in the FEP polymer which then leads to a breakdown of the macromolecular network. This is also consistent with the loss of visible color (i.e., individual or low molecular weight macromolecules of $V_2O_5$ are transparent in the visible while large macromolecular networks show colors ranging from light yellow to orange). Upon removing this material from the HF solution, it was observed that the yellow color returned within a few hours and that the UV-vis spectrum obtained from this material showed the same features observed with the FEP material before it was exposed to the HF. This indicates not only that the macromolecular network was reformed and that the process is reversible, but also that other molecules can readily diffuse into and out of these materials and easily interact with the inorganic portion of the composite material.

Example 2

Preparation and Characterization of $V_2O_5$ in Polyethyleneterephthalate

The same experiment as described in Example 1 was performed using a piece of polyethyleneterephthalate ("PET"), which is a polyester containing only aliphatic carbon and ester functionality. Upon exposing the PET in the same manner as that described in Example 1, the same observations were made. That is, initially the PET film was transparent and within a few hours turned to yellow green. Although the color to the eye was slightly different, the UV-vis results showed a similar spectrum as that observed for the FEP. XPS, on the other hand, showed a binding energy of ca. 517.5 eV which is consistent with $V_2O_5$. This further supports the results in Example 1, which indicated that the vanadium was somehow complexed to the fluorine functionality thereby increasing its XPS binding energy. These results suggest that the electronic state of the inorganic material in the free volume of the polymer matrix can be influenced by the functional groups contained in the polymer making up the polymer matrix.

Example 3

Preparation and Characterization of $Fe_2O_3$ in Polytetrafluoroethylene-co-hexafluoropropylene A piece of FEP polymer was treated exactly in the same manner as that described in Example 1, except that instead of using $V(O)Cl_3$, 1 ml of $Fe(CO)_5$ was vacuum transferred to the flask containing the FEP. The temperature and treatment time was identical to those described in Example 1. Upon removal the film turned deep orange. XPS and UV-vis results indicated the formation of $Fe_2O_3$. A slight shift to higher binding energy in the XPS for the $Fe_2O_3$-FEP material indicated that the iron was, in some manner, electronically coupled to the fluorine functionality in the FEP.

In accordance with this invention the materials are contemplated as useful light and electromagnetic radiation shields or filters. Examples 1–3 showed that vanadium and iron macromolecular networks can be formed within FEP and PET. Both of FEP and PET are lightweight and flexible. Additionally, the FEP material is extremely resistant to weathering and is chemically inert. Contact angle experiments were performed on the material made in Example 1 and showed negligible change in the surface properties of the FEP fluoropolymer (i.e., the water contact angle was still greater than 90 degrees), indicating that the inherent resistance to weathering and inertness to solvents and chemicals for this fluoropolymer were left intact. Thus, Examples 1–3 show that the methods of the present invention can be used to make flexible, lightweight, materials which have UV radiation absorbance and which have surfaces which resist weathering, fouling, and chemical degradation.

Example 4

Preparation and Characterization of $TiO_2$ in Polytetrafluoroethylene-co-hexafluoropropylene In Examples 1–3, the vanadium and iron inorganic networks imparted a visible hue to the polymeric materials, which would be undesirable in applications requiring high transparency in the visible region of the light spectrum. To provide a material which is transparent to visible light but which blocks or absorbs large amounts of UV radiation, another inorganic complex, based on titanium, can be used.

A piece of FEP polymer was treated exactly in the same manner as that described in Example 1 except that instead of using $V(O)Cl_3$, 1 ml of $TiCl_4$ was vacuum transferred to the flask containing the FEP. The temperature and treatment time were identical to those described in Example 1. Upon removal, the film was totally transparent to the naked eye and was never observed to change. XPS and UV-Vis results indicated the formation of $TiO_2$, and a slight shift to higher binding energy in the XPS was observed, which indicated that the titanium was in some manner electronically coupled to the fluorine functionality in the FEP.

Example 5

Preparation, Characterization, and Use of $WO_3$ in Polytetrafluoroethylene-co-hexafluoropropylene Although titanium, vanadium, and iron are good UV radiation shields, it would also be of use to form a network of a high Z number (i.e., high density or heavy weight) metal. High Z number metals are efficient for not only blocking UV radiation but are more often used for shielding high energy UV and x-radiation. Tungsten belongs to this class of metals. However, no metallic complex of tungsten exists in a liquid form capable of being boiled into a gas phase. In view of this, a different method for self-assembling of a tungsten heteropolycondensate into polymers was developed.

A 2"×2" piece of FEP polymer was placed in a 100 ml round bottom flask along with 100 mg of $W(CO)_6$. The flask was connected to a vacuum line and then pumped down to less than 10 mTorr pressure. Next, the flask was heated to 75° C., which, at 10 mTorr pressure, was sufficiently high to initiate the sublimation of the $W(CO)_6$ and to create a vapor phase of the tungsten complex within the flask. After 1 hr, the FEP material was removed and placed under ambient air conditions for 2 hrs. UV-Vis experiments showed a large absorbance band at 228 nm (A=3.4) with a smaller absorbance band at 288 nm (A=0.4), indicating the formation of a complex inside the FEP. The sample was highly transparent in the visible region of the spectrum. Unlike the vanadium, titanium, and iron samples used in Examples 1–4, not only did this particular tungsten complex need to be sublimed instead of boiled, it also possessed carbonyl ligands which are relatively stable compared to those on the metal complexes used in Examples 1–4. Thus, after obtaining the UV-Vis spectra, the FEP sample was placed under a high energy, broad band ultraviolet source centered at 254 nm in the presence of air for 1 hr. The carbonyl ligands associated with this tungsten compound are known to be photoactive under UW radiation.

After exposing the sample to the UV lamp, several changes were observed in the UV-vis spectrum. The absorbance at 288 nm decreased slightly to A=0.37; the band at 228 nm decreased from A=3.4 to 1.1; and, at 190 nm (which is the limit of the instrument's capability with respect to measuring low wavenumber absorbance values), the absorbance changed from 0.4 (before UV irradiation) to 1.5 (after UV irradiation). It is believed that this indicates that the complex formed after irradiation had a greater propensity for shielding higher energy radiation (i.e., radiation at lower wavenumbers) and would be quite useful as such as a flexible, visibly transparent material. $WO_3$ is well known for its ability to shield x-radiation. It was observed that, after having been diffused into the FEP, the tungsten compound absorbed in the mid UV range, as would be expected had the tungsten carbonyl, after having been diffused into the FEP, retained either all or a portion of its original carbonyl ligands. Macromolecular tungsten complexes are known for their ability to shield high energy radiation, which is what was observed after the carbonyls were removed by UV radiation in the presence of water- or oxygen-containing air. This supports the proposition that treatment with UV radiation in the presence of air produced hydrolyzed and/or oxidized form of tungsten which then self-assembled with neighboring hydrolyzed or oxidized tungsten to form a macromolecular complex.

Example 6

Stability of Polycondensate Networks Incorporated in FEP Via Exposure To Supercritical $CO_2$ Environments 6"×6" pieces of FEP were treated in the same fashion as the FEP treated in Example 1. After these FEP films were metallated with $V_2O_5$ as described, the films were placed into a high pressure stainless steel vessel. The vessel was then charged with 2500 psi of $CO_2$ gas at 40° C. These conditions result in the formation of a supercritical $CO_2$ environment under which FEP is known to swell. Swelling of FEP films under these conditions allows for the rapid exchange of $CO_2$ with weakly bonded molecules contained within the free volume of the polymer. The FEP samples in this example were left under these conditions for 72 hrs. UV-vis analysis of the FEP films (after 72 hrs) indicated only negligible $V_2O_5$ loss (less than 10%) and suggested that the network formed within the polymer matrix was either: (1) permanently entrapped inside the polymer due to physical interactions between the polymer chains with formed heteropolycondensate macromolecules, and/or: (2) permanently entrapped inside the polymer due to chemical or electronic interactions between the functional groups contained within the polymer and the atoms and/or functional groups of the heteropolycondensate macromolecular network. The stability demonstrated in this example makes these materials good candidates for use as heterogeneous catalysts utilized under supercritical process conditions.

Likewise the experiment was performed using small 50 micrometer beads of the copolymer ethylenechlorotrifluoroethylene ("ECTFE") which also contained macromolecular networks of $V_2O_5$. These materials were prepared also using the procedure described in Example 1. ) Again, there was no observed loss of the $V_2O_5$ inorganic material after exposure to the supercritical conditions. It is believed that these experiments show that the macromolecular inorganic networks can be permanently stabilized into polymer matrices either by coordinating with functional groups (like the fluorine and/or chlorine groups contained within FEP and ECTFE) or by entanglement within chains contained in the amorphous regions of the polymer where the inorganic networks are formed. Furthermore, because these materials are stable under supercritical conditions, they can be used as heterogeneous catalysts in supercritical fluid reactors, such as those described in Patchornick, Winslow, and Cunnington, which are hereby incorporated Iy reference.

Example 7

Stability of Polycondensate Networks Incorporated in PTFE, ECTFE, PVDF, PMMA, PP, PS, and PVDF Via Exposure To Supercritical $CO_2$ Environments 2"×2" pieces of PTFE, ECTFE, PVDF, polymethylmethacrylate ("PMMA"), polypropylene ("PP"), polystyrene ("PS"), and polyvinylidene fluoride ("PVDF"), were treated in the same fashion as the FEP treated in Example 1. After these films were metallated with $V_2O_5$ they were first analyzed by UV-vis spectroscopy as described previously, the films were then placed into a high pressure stainless steel vessel. The vessel was then charged with 2500 psi of $CO_2$ gas under ambient temperatures. The samples were left under these conditions for 72 hrs. UV-vis analysis of these films (after 72 hrs) indicated only negligible $V_2O_5$ loss (less than 10%) and suggested that the network formed within the polymeric matrices were either: (1) permanently entrapped inside the polymer due to physical interactions between the polymer chains with formed heteropolycondensate macromolecules, and/or: (2) permanently entrapped inside the polymer due to chemical or electronic interactions between the functional groups contained within the polymer and the atoms and/or functional groups of the heteropolycondensate macromolecular network. The stability demonstrated in this example makes these materials good candidates for use as heterogeneous catalysts which may be utilized under supercritical conditions.

Example 8

Heterogeneous Catalysis of $SO_2$ to $SO_3$

A 3"×18" piece of a 1.0 mil thick sample of FEP was treated in the same fashion as the FEP material treated in Example 1. The piece of metallated ($V_2O_5$) FEP was then place into a 100 ml stainless steel reactor which was then charged with 4 atmospheres of $O_2$ and 1 atmosphere of $SO_2$. The vessel was then heated to 70° C. for 24 hrs. After this treatment, the vessel was opened, and the FEP was removed. Next, a calibrated amount of deionized $H_2O$ was added to the vessel to convert any $SO_3$ which was formed during the catalytic reaction to $H_2SO_4$. Using a pH meter to measure the resultant acidity of the added deionized $H_2O$, the pH was determined to be 1.8. Calculations involving the initial concentration of $SO_2$ and the resultant pH of the known amount of added $H_2O$ determined that greater than 90% of the $SO_2$ was catalytically converted to $SO_3$. Subsequent analysis (by UV-Vis spectroscopy) of the metallated FEP showed no detectable loss of $V_2O_5$, thus indicating the stability of the $V_2O_5$ macromolecular network within the FEP film during the catalytic procedure.

Molecular transformations which utilize $V_2O_5$ as an oxidation catalyst for converting $SO_2$ to $SO_3$ often require reaction temperatures greater than 500° C., which indicates that the material used here may have enhanced capabilities with respect to its operation as a heterogeneous catalyst. Further, the results from this example, though only illustrative, demonstrate the utility of $V_2O_5$ and other metallic complexes interpenetrated into inorganic-organic materials as oxidation catalysts.

Example 9

EMI Shields, UV Light Filters, and Photolithographic Masking Materials

Examples 1–8 showed materials which absorb UV and x-radiation at levels which may be useful for coatings or films which inhibit and/or attenuate radiation from penetrating these films while in contact with UV, extreme UV, and X-ray sensitive materials. As one example, this is demonstrated by the U-Vis absorbances throughout the UV-Vis spectrum range (i.e., 190 nm–400 nm) of greater than 2.0 absorbance units (i.e., 99% UV absorbance) for films infused with vanadium or titanium. Further, these results, when taken together with the results which indicate the formation of macromolecular networks of inorganic/metallic complexes in the composites of the present invention, suggest that the composites are useful for either absorbing electromagnetic radiation, reflecting electromagnetic radiation, or transforming various electromagnetic radiation into electrical current (i.e., acting as an electromagnetic interference ("EMI") shield).

Since conventional photolithographic and imaging processes require polymeric photoresist materials capable of blocking these different types of radiation during exposure steps, the composites of the present invention can be used as masks in such conventional photolithographic and imaging processes. For Example, U.S. Pat. No. 5,387,481 to Radford et al. ("Radford"), which is hereby incorporated by reference, describes a vanadium oxide which can act as a switchable shield for blocking electromagnetic radiation. The vanadium oxide compound used in Radford, when heated, is said to exhibit a marked and rapid transition from a dielectric material, which is transparent to electromagnetic radiation, to a metallic, electromagnetic radiation shield, which is impervious to electromagnetic radiation. In Radford, the vanadium oxide material is applied as a thin film to a solid substrate. In the present invention the vanadium oxide can be initially incorporated into an a polymer matrix to produce a composite according to the present invention. Upon heating, the vanadium oxide would be transformed from a material which is transparent to electromagnetic radiation to one which effectively blocks such radiation. This example is only illustrative: other composites of the present invention, particularly those which contain conductive macromolecular networks (e.g., those containing Ti, Fe, Pb, and Au) can act as efficient blockers of electromagnetic radiation, such as UV, extreme UV, and x-radiation.

Example 10

Battery and Fuel Cell Separators

Example 1, above, showed that molecules of hydrofluoric acid ("HF") and ions generated therefrom could interpenetrate into a fluoropolymeric material like FEP and PET which contained a vanadium macromolecular complex. This was demonstrated by UV-Vis data which showed the disappearance of certain molecular absorbances as well as by the naked eye which showed that the material turned from yellow-orange to a totally transparent material when placed into the HF solution. Further these materials were observed to change back to a yellow-orange color, with no detectable loss of the vanadium complex, upon removing the HF solution and exposing the material to air. This demonstrates that, even after formation of the composite material, both gas phase and liquid phase molecules and ions can be transported through the material and can react or coordinate with the vanadium (or any other metal or inorganic complex) contained within the free volume of the polymer matrix in a reversible fashion. Further, as described above, many of the inorganic materials incorporated within the free volume of the polymer matrix contain catalytically active metals or metals which can act as good redox materials (i.e., metals which can donate or accept electrons from charged ions or molecules). The ability of gases and liquids to diffuse into free volumes containing catalysts or redox materials suggests that the composites of the present invention are useful as electrodes and separation materials, such as in battery and fuel cell applications.

For example, U.S. Pat. No. 5,470,449 to Bachot et al., which is hereby incorporated by reference, describes the preparation of microporous diaphragms adapted for wet-consolidation with composite cathodes for use in electrolytic cells. These microporous diaphragms include a sintered fluoropolymer microporous fibrous sheet material containing from 3% to 35% by weight of fluoropolymer binder and from 0% to 50% by weight of a uniformly distributed gel of an oxohydroxide (i.e., a heteropolycondensate) prepared from a metal like Ti or Si.

The methods of the present invention can be used to make a composite of a fluoropolymeric matrix material having macromolecular networks of metal oxohydroxides incorporated therein. For example, Ti oxohydroxides can be networked into FEP films as described in Example 4. As a further example, a macromolecular network of Si oxohydroxide was also incorporated into an FEP film by first placing a 12"×2" piece of FEP into a 100 ml round bottom flask, connecting the flask to a vacuum line, pumping the flask down to less than 10 mTorr pressure, and vacuum transferring about 1 ml of $SiCl_4$ to the flask. The flask was then closed and heated to about 75° C. under vacuum so that a gas phase of $SiCl_4$ filled the entire volume of the flask for 1 hr. The $SiCl_4$ was then vacuum transferred off the FEP polymer, and the flask was opened to ambient air. Upon exposure to air, the $SiCl_4$, which was incorporated into the FEP film, underwent hydrolysis, which resulted in the formation of a macromolecular network of Si oxohydroxide, as confirmed by IR spectroscopy which measured Si—O absorbance at about 1025 $cm^{-1}$.

The composites of the present invention can also be used in the electrolytic cells and fuel cells described in U.S. Pat. No. 5,512,389 to Dasgupta et. al. ("Dasgupta"), which is hereby incorporated by reference. Dasgupta describes the use of a solid polymer electrolyte in a non-aqueous, thin film rechargeable lithium battery. They can also be used in electrochemical cells in place of the halogenated (e.g., fluoropolymeric) separator material used in the electrochemical cells described in U.S. Pat. No. 5,415,959 to Pyszczek et al., which is hereby incorporated by reference. As a further illustration, the composites of the present invention can be used as a solid polymer electrolyte in place of the solid polymer electrolyte (prepared by bonding catalytic metals to solid polymeric materials) used in U.S. Pat. No. 5,474,857 to Uchida et al., which is hereby incorporated by reference.

Example 11

Electrically Conductive Flexible Materials for Optoelectronics

Many of the heteropolycondensates formed within the polymeric matrices using the methods of the present invention have electrical and electrical and/or ionic conductivity properties which make them useful in technologies which require flexible materials having electrically or ionically conductive and/or antistatic characteristics. For example, MacDiarmid et. al., *Proc. Materials Research Society*, Boston, Mass. (November 1995) and copending U.S. patent application Ser. No. 08/401,912, which are hereby incorporated by reference, describe the use of conducting polymers adhered to flexible substrates as flexible electrode materials in the construction of electro-optical devices. By appropriate choice of a flexible polymer matrix, the methods of the present invention can be used to produce conducting composites which can be used in such electro-optical devices.

For example, a 4"×4" sheet of FEP was placed into a 100 ml round bottom flask. The flask was connected to a vacuum line and then pumped down to less than 10 mTorr pressure. Next, about 1 ml of pyrrole was vacuum transferred to the flask, and the flask was closed and heated to about 75° C. under vacuum so that a gas phase of pyrrole molecules filled the entire volume of the flask for 1 hr. The pyrrole was then vacuum transferred off the FEP polymer, and the flask was opened to ambient air. The sample was then placed into an oxidizing solution of $HNO_3$ for 12 hrs. Upon removal, the film had acquired a grey tint. Inspection by UV-Vis confirmed the formation of a polypyrrole network within the FEP matrix.

As a prophetic example, heteropolycondensates of indium and tin, known as indium tin oxide ("ITO"), when evaporated onto a variety of substrates, are used commercially as a transparent conducting film. These ITO films are used as electrode materials in the construction of many electro-optical devices (e.g., liquid crystal based flat panel displays). The methods of the present invention can be used to produce conductive thin films which can be used in place of the ITO films in such electro-optical devices. To illustrate this aspect of the present invention, a 4"×4" sheet of FEP can be placed into a 100 ml round bottom flask. The flask is then connected to a vacuum line and pumped down to less than 10 mTorr pressure. Next, about 1 ml of triethylindium and about 1 ml of $SnCl_4$ is vacuum transferred to the flask. The flask is then closed and heated to about 75° C. under vacuum so that a gas phase of both the triethylindium and $SnCl_4$ fills the entire volume of the flask for 1 hr. The triethylindium and $SnCl_4$ are then vacuum transferred off the FEP polymer, and the flask is opened to ambient air. Upon exposure to air, both the triethylindium and the $SnCl_4$ which are incorporated into the FEP film undergoes hydrolysis, which results in the formation of a macromolecular network of ITO.

Example 12

Electronic Imaging Applications

Rajeshwar, which is hereby incorporated by reference, describes the use of polymer films containing nanodispersed catalyst particles of electronically conductive polymers containing polypyrrole, polyaniline, and polythiophene in imaging applications. The polymer films described in Rajeshwar can be replaced by the composites of the present invention to produce materials useful in imaging.

For example, polypyrrole containing composites can be prepared and treated in the following manner. A polypyrrole deposition solution was prepared by mixing 100 ml of a solution containing 0.6 ml of pyrrole in deionized water together with 100 ml of a solution containing 3.4 g $FeCl_3.6H_2O$, 0.98 g anthraquinone-2-sulfonic acid sodium salt monohydrate, and 5.34 g 5-sulfosalicylic acid dihydrate in deionized water. The polypyrrole films were then deposited onto a polyethyleneterephthalate ("PET") film measuring 2"×2" by immersing the PET film for 5 min into a magnetically stirred polypyrrole deposition solution. The PET having a film of polypyrrole thereon was then ultrasonicated in methanol, rinsed with deionized water, and dried under $N_2$. The film of polypyrrole on PET was then treated in the same fashion as the FEP treated in Example 1 (to incorporate a $V_2O_5$ heteropolycondensate macromolecular network). After the film containing $VOCl_3$ was exposed to air to facilitate hydrolysis, it was examined by UV-Vis spectroscopy, and the spectrum was compared to the UV-Vis spectrum initially obtained from the polypyrrole film which was deposited onto the PET material. The comparison of UV-Vis spectra showed differences which substantiated the incorporation of $V_2O_5$ into the conducting layer of polypyrrole.

In an alternative method, a 4"×4" film of FEP was treated as described in Example 1 (i.e., incorporated with a $V_2O_5$ heteropolycondensate macromolecular network). The film was then placed into a 100 ml round bottom flask, and the flask was connected to a vacuum line and pumped down to less than 10 mTorr pressure. Next, about 1 ml of pyrrole was vacuum transferred to the flask, and the flask was then closed and heated to about 75° C. under vacuum so that a gas phase of pyrrole molecules filled the entire volume of the flask for 1 hr. The pyrrole was then vacuum transferred off the FEP polymer, and the flask was opened to ambient air. It was observed, with no further treatment, that the film had acquired a grayish tint normally associated with polypyrrole. UV-Vis spectroscopy confirmed that the pyrrole which had diffused into the FEP material had been oxidized by the $V_2O_5$ contained in the film prior to exposure to the pyrrole. The UV-Vis spectroscopy also confirmed that the pyrrole molecules had been oxidatively converted to a polymeric macromolecular network of polypyrrole.

The composites of the present invention can also be used as electroconductive imaging elements, such as those used in high speed laser printing processes which utilize electrostatography. For example, the composite of the present invention can be used as a replacement for the electroconductive imaging element described Anderson I, which is hereby incorporated by reference. Suitable composites for use as electroconductive imaging elements include the materials described in Examples 1 and 2 which incorporate $V_2O_5$ macromolecular networks into both PET and FEP. Using the UV-Vis measurements obtained in Examples 1 and 2, it was calculated that both the PET and the FEP materials contained greater than 40 milligrams of $V_2O_5$ per square meter. Using processes described herein, the concentration of inorganic and/or organic macromolecular networks formed within the polymer matrix can be reduced to the levels of $V_2O_5$ disclosed in Anderson I, e.g., about 3 mg per square meter.

Example 13

Methods for Controlling the Concentration of Inorganic and/or Organic Heteropolycondensates in Polymeric or Inorganic-organic Matrices All of the above examples describe methods for making composites which contain polymers and inorganic-organic hybrid materials having macromolecular networks of polymers and/or macromolecular networks of inorganic polycondensates incorporated within their matrices in regions referred to and defined in the specifications of this application as free volume. The methods used and described in previous examples demonstrate the ability to conveniently diffuse inorganic and/or organic molecules into free volume spaces inherent in any polymeric or inorganic-organic hybrid material and, then, to convert these molecules to large macromolecular networks or macromolecular polycondensates. These free volumes can be thermally controlled so that the concentration or total amount of organic network or inorganic polycondensate which is incorporated into the total volume of the template polymeric or inorganic-organic hybrid material can also be controlled. Essentially, as one increases the temperature during the initial step of diffusing any inorganic, metallic, or organic molecule into a given polymer or inorganic-organic hybrid material, one also increases the free volume into which these materials can diffuse (providing the temperature is below the thermal decomposition temperature of the polymer or inorganic-organic hybrid material and the decomposition temperature of the starting inorganic, metallic, or organic molecule). To illustrate this phenomenon, a series of FEP materials were exposed to $VOCl_3$ and subsequently hydrolyzed to $V_2O_5$ in the same manner as that described in example 1, except that they were initially exposed to the $VOCl_3$ vapor at different temperatures. By measuring the UV-Vis absorbance at 225 nm it was observed that at 27° C., A=0.14; at 40° C., A=0.31; at 60° C., A=1.05; at 70° C., A=1.63; at 80° C., A=2.5; and at 90° C., A=3.14. These results demonstrate that control over the concentration of introduced macromolecular material can be facilitated by the methods described herein.

Example 14

Localization of the Macromolecular Network

This example establishes that the maicromolecular networks form primarily in the free volume of the polymer matrix. As described above, conventional methods for making inorganic-organic hybrids involve either: (1) solubilizing an inorganic precursor capable of forming a macromolecular network within a polymeric material with a solvent appropriate for solubilizing both the starting polymer and the starting inorganic molecule, adding a hydrolyzing agent, and drying and/or curing the mixture to form a composite material, (2) adding an inorganic precursor which is capable of forming a macromolecular network along with a hydrolyzing agent to a molten polymeric material and drying and/or curing the mixture to form a composite material, or (3) using supercritical fluids. In the first two cases, the resulting material contains both the starting polymeric material and an inorganic heteropolycondensate. Due to mixing and curing, the resulting material dries and/or cures simultaneously to form a material dependent on the presence of both the initial starting polymeric material and the formed heteropolycondensate. In other words, the polymer's final physical (i.e., morphological), electrical, and chemical properties are substantially changed from that of the starting polymeric material. Further, fine control over the resulting properties of the composite material is difficult and requires extensive trial and error, which may show that the desired property is not permitted by the technique utilized. In the third case, use of supercritical conditions gives rise to a variety of disadvantages, such as those discussed above.

In the composites of the present invention, the polymeric or inorganic-organic hybrid materials act only as templates to support the formation of macromolecular organic or inorganic polycondensate networks within their free volume. This not only can preserve many of the physical, electrical, and chemical properties of both materials, but also allows one to controllably enhance desired properties of either the polymeric matrix material or the incorporated macromolecular network (e.g., catalytic activity).

For example, preparation of an inorganic-organic hybrid porous filter material using methods described in the prior art requires that the material be first melted or dissolved and then mixed with at least an inorganic precursor. This mixture must then be dried and/or cured so that it has similar porosity to that of the starting polymer. This is difficult if not impossible due to the new nature of the hybrid material melt or solvated material. In contrast, by treating the same porous filter material using methods of the present invention, the desired characteristics can be imparted to the pre-formed filter material without changing the physical pore size or the surface morphology of the filter material.

Example 13 shows that the composites of the present invention contain organic macromolecules and heteropolycondensate networks within the free volume of polymeric and inorganic-organic hybrid materials. To further characterize the composites of the present invention, thermal analyses were conducted on a variety of materials prepared by the methods of the present invention. More particularly, thermal decomposition ("Td") and differential scanning calorimetry ("DS") studies were performed on two separate films of ECTFE containing heteropolycondensate networks of titanium and vanadium respectively. The films were prepared using the procedures described in Examples 1,2 and 4. Results showed only negligible change in the material's decomposition temperature and no change in their degree of crystallinity (i.e., no change in the original polymer's morphology). Likewise, using the procedures described in Examples 1–3, two films of perfluorinated alkoxy resin were treated so that one contained a heteropolycondensate network of titanium and the other vanadium. These samples also showed no change in decomposition temperature or degree of crystallinity. Finally, two films of FEP were likewise treated and also showed negligible changes with respect to the Td and DSC measurements.

These results indicate that the macromolecular networks form along the free volume spaces of the polymeric matrix materials and preserve the morphology of the inherent structure (i.e., crystallinity and physical morphology) of the polymeric matrix.

Example 15

Increasing and/or Stabilizing the Mechanical Strength of Materials

Example 8 showed how the chemical functionality and the electronic nature of a polymeric matrix could act to enhance the catalytic activity of a metal center contained within a macromolecular vanadium polycondensate (i.e., a $V_2O_5$ network incorporated into a fluoropolymeric material). Conversely, the functionality contained in a heteropolycondensate network incorporated into a polymer or inorganic-organic hybrid material can be made to influence the chemical, thermal, and/or mechanical strength of the matrix material. Many polymers are well known to physically or chemically degrade either thermally, chemically, or through the exposure to actinic radiation. This ultimately leads to loss in the material's mechanical strength. For example, thermal mechanical analysis ("Tm") of ECTFE shows that, when it is exposed to temperatures of or about 250° C., mechanical strength significantly decreases (i.e., the polymer melts and begins to flow).

To demonstrate that the functionality contained in a macromolecular network disposed in a polymer matrix's free volumes can influence the chemical, thermal, and/or mechanical strength of the polymeric matrix material, two 2"×2" pieces of ECTFE were treated in the same manner as were the FEP samples described in Examples 1,2 and 4. One piece of ECTFE contained a macromolecular network consisting of the heteropolycondensate $V_2O_5$, and the other contained a heteropolycondensate of $TiO_2$. Both materials were analyzed via thermal mechanical analysis, which measures mechanical strength as a function of temperature. In the case where the ECTFE film was incorporated with $V_2O_5$, no change was observed in its mechanical strength as a function of increased temperature, indicating little or no interaction between the incorporated $V_2O_5$ and the ECTFE polymer upon heating. In contrast, Tm measurements on the $TiO_2$ incorporated ECTFE showed an interaction of the $TiO_2$ polycondensate network with the ECTFE after thermally treating the composite which resulted in no observable loss of the ECTFE's mechanical strength up to temperatures at or around 400° C. This was an increase of over 125° C. compared to the untreated ECTFE, which indicates that the $TiO_2$ network interacts during heating (but not after the initial formation of the composite) with the ECTFE and acts to stabilize the structure which in turn preserves and extends the ECTFE's mechanical strength at temperatures 125° C. above its normal usefulness.

Example 16

Anti-static Materials Used as Photographic Elements and Support Layers

The composites of the present invention can be used as anti-static materials for use as photographic elements and support layers. U.S. Pat. No. 5,284,714 to Anderson et al. ("Anderson II"), which is hereby incorporated by reference, describes photographic support materials comprising an anti-static layer and a heat thickening barrier layer. The anti-static layer comprises a $V_2O_5$ film applied to a material which is overcoated with a heat thickening polyacrylamide layer. The composites of the present invention can be used in place of the antistatic layer used in Anderson II. For example, instead of applying a thin layer of polyacrylamide on top of an anti-static $V_2O_5$ film, one can simply incorporate the anti-static $V_2O_5$ directly into the polyacrylamid using the methods of the present invention.

Similarly, U.S. Pat. No. 5,366,544 to Jones et al. ("Jones") which is hereby incorporated by reference, describes the use of an anti-static layer used as a photographic imaging element prepared by mixing $V_2O_5$ into a polymeric cellulose acetate binder. Using the methods of the present invention, $V_2O_5$ can be incorporated directly into a cellulose acetate binder. This material can then be used in place of the anti-static layer described in Jones.

Finally, U.S. Pat. No. 5,439,785 to Boston et al, ("Boston"), which is hereby incorporated by reference, describes photographic elements comprising anti-static layers of $V_2O_5$, epoxy-silanes, and sulfopolyesters. Using the methods of the present invention, $V_2O_5$ can be readily incorporated into sulfopolyesters as well as epoxy-silanes, and these materials can be used as antistatic layers in the photographic elements disclosed in Boston.

Example 17

Infusion of Stabilized Metal Species Into a Preformed Polymeric Material

A 2"×2" piece of FEP polymer film was placed into a glass tube with 100 mg of ferrocene, and the tube was connected to a vacuum line and pumped down to less than 10 mTorr pressure. Next, the glass tube containing the FEP film and ferrocene was sealed under vacuum and immersed in an oil bath at 8020 C., which, at 10 mTorr pressure, is sufficiently high to sublime and produce a gas phase of ferrocene within the reaction tube. After 1 hr, the FEP was removed from the reaction vessel and thoroughly rinsed in toluene for 30 min. In this example the infused ferrocene molecules do not form macromolecular networks, and the stability of the ferrocene molecules depends on their ability to complex or interact with the fluorine functionality contained within the FEP polymer. Incorporation of the ferrocene was confirmed via analysis by UV-Vis spectroscopy.

Example 18

Infusion of Pi-allyl Metal Complexes Into Preformed Polymeric Materials

A polymer film can be first placed along with 100 mg of pi-allyl complex into a reaction vessel which is subsequently attached to a vacuum line. The vessel is pumped down to less than 10 mTorr at −196° C. The evacuated vessel is then heated to 80° C. for 1 hr. The polymer film is removed from the reaction vessel and then exposed to an atmosphere of $H_2$ gas which converts the allyl complex contained within the polymer to a reduced metal form which is stabilized within the polymeric material with concurrent release of propane gas out of the polymeric film.

Although the invention has been described in detail for the purpose of illustration, it is understood that such detail is solely for that purpose, and variations can be made therein by those skilled in the art without departing from the spirit and scope of the invention which is defined by the following claims.

What is claimed:

1. A composite comprising:
   a polymer matrix having natural free volume therein; and
   an inorganic or organic material disposed in the natural free volume of said polymer matrix, wherein said polymer matrix is at least partially amorphous and wherein said polymer matrix comprises a halopolymer.

2. A composite according to claim 1, wherein said natural free volume contains substantially no carrier liquid.

3. A composite according to claim 1, wherein the natural free volume is defined by free volume surfaces and wherein said inorganic or organic material is present as a layer on or along the free volume surfaces.

4. A composite according to claim 1, wherein said polymer matrix comprises a functionality selected from the group consisting of a halogen atom, an amine group, an alkene group, an alkyne group, a carbonyl group, an alcohol group, a thiol group, and combinations thereof.

5. A composite according to claim 4, wherein the functionality is a halogen atom.

6. A composite according to claim 4, wherein the functionality is a fluorine atom.

7. A composite according to claim 4, wherein said inorganic or organic material is an inorganic or organic macromolecular network.

8. A composite according to claim 7, wherein the inorganic or organic macromolecular network is an inorganic macromolecular network.

9. A composite according to claim 7, wherein the inorganic macromolecular network has the formula $(X(O)_n—O_y—X(O)_n)_m$, wherein m is an integer from about 1 to about 10,000; X represents a metal ion having a charge of +s; s is an integer from 1 to the metal's highest attainable oxidation state; y is an integer from 0 to s; and n is between zero and s/2.

10. A composite according to claim 1, wherein said inorganic or organic material is a metal network containing a Group IIIa, IVa, Va, VIa, or VIIa metal or a metal selected from the group consisting of Fe, Ru, Os, Co, Rh, Ir, Ni, Pd, and Pt.

11. A composite according to claim 7, wherein the inorganic or organic macromolecular network is an organic macromolecular network.

12. A composite according to claim 11, wherein the organic macromolecular network has the formula $-(R-R)_n-$, wherein n is an integer from about 1 to about 10,000 and R is a monomer radical.

13. A composite according to claim 11, wherein the organic macromolecular network comprises polyacetylene, polypyrrole, polyaniline, polythiophene, or combinations thereof.

14. A composite according to claim 1, wherein said polymer matrix comprises a fluoropolymer.

15. A composite according to claim 1, wherein said polymer matrix has a crystallinity of less than about 99%.

16. A composite according to claim 1 having a volume of $V_c$, wherein the natural free volume is greater than about $1 \times 10^{-6} V_c$.

17. A composite according to claim 1, wherein said inorganic or organic material is an inorganic material comprising a metal selected from the group consisting of V, W, Fe, Ti, Si, Al, P, Sb, As, Ba, B, Cd, Ca, Ce, Cs, Cr, Co, Cu, Ga, Ge, In, Pb, Mg, Hg, Mo, Ni, Nb, Re, Ta, Tl, Sn, Ir, Rh, Th, Ru, Os, Pd, Pt, Zn, Au, Ag, and combinations thereof.

18. A composite comprising:
a polymer matrix having natural free volume therein; and
an inorganic or organic material disposed in the natural free volume of said polymer matrix, wherein said polymer matrix is at least partially amorphous, wherein said polymer matrix is an organic polymer matrix, and wherein said inorganic or organic material is an inorganic or organic macromolecular network.

19. A composite according to claim 18, wherein said natural free volume contains substantially no carrier liquid.

20. A composite according to claim 18, wherein the natural free volume is defined by free volume surfaces and wherein said inorganic or organic material is present as a layer on or along the free volume surfaces.

21. A composite according to claim 18, wherein said polymer matrix comprises a functionality selected from the group consisting of a halogen atom, an amine group, an alkene group, an alkyne group, a carbonyl group, an alcohol group, a thiol group, and combinations thereof.

22. A composite according to claim 21, wherein the functionality is a halogen atom.

23. A composite according to claim 21, wherein the functionality is a fluorine atom.

24. A composite according to claim 18, wherein the inorganic or organic macromolecular network is an inorganic macromolecular network.

25. A composite according to claim 24, wherein the inorganic macromolecular network has the formula $(X(O)_n—O_y—X(O)_n)_m$, wherein m is an integer from about 1 to about 10,000; X represents a metal ion having a charge of +s; s is an integer from 1 to the metal's highest attainable oxidation state; y is an integer from 0 to s; and n is between zero and s/2.

26. A composite according to claim 24, wherein said inorganic or organic material is a metal network containing a Group IIIa, IVa, Va, VIa, or VIIa metal or a metal selected from the group consisting of Fe, Ru, Os, Co, Rh, Ir, Ni, Pd, and Pt.

27. A composite according to claim 18, wherein the inorganic or organic macromolecular network is an organic macromolecular network.

28. A composite according to claim 27, wherein the organic macromolecular network has the formula $-(R—R)-_n$, wherein n is an integer from about 1 to about 10,000 and R is a monomer radical.

29. A composite according to claim 27, wherein the organic macromolecular network comprises polyacetylene, polypyrrole, polyaniline, polythiophene, or combinations thereof.

30. A composite according to claim 18, wherein said polymer matrix comprises halopolymers, polyimides, polyamides, polyalkylenes, poly(phenylenediamine terephthalamide) filaments, polyethyleneterphthalates, modified cellulose derivatives, starch, polyesters, polymethacrylates, polyacrylates, polyvinyl alcohol, copolymers of vinyl alcohol with ethylenically unsaturated monomers, polyvinyl acetate, poly(alkylene oxides), vinyl chloride homopolymers and copolymers, terpolymers of ethylene with carbon monoxide and with an acrylic acid ester or vinyl monomer, polysiloxanes, homopolymers and copolymers of halodioxoles and substituted dioxoles, polyvinylpyrrolidone, or combinations thereof.

31. A composite according to claim 18, wherein said polymer matrix comprises a halopolymer.

32. A composite according to claim 31, wherein said polymer matrix comprises a fluoropolymer.

33. A composite according to claim 18, wherein said polymer matrix has a crystallinity of less than about 99%.

34. A composite according to claim 18 having a volume of $V_c$, wherein the natural free volume is greater than about $1 \times 10^{-6} V_c$.

35. A composite according to claim 18, wherein said inorganic or organic material is an inorganic material comprising a metal selected from the group consisting of V, W, Fe, Ti, Si, Al, P, Sb, As, Ba, B, Cd, Ca, Ce, Cs, Cr, Co, Cu, Ga, Ge, In, Pb, Mg, Hg, Mo, Ni, Nb, Re, Ta, Tl, Sn, Ir, Rh, Th, Ru, Os, Pd, Pt, Zn, Au, Ag, and combinations thereof.

36. A composite comprising:
a polymer matrix having natural free volume therein; and
an inorganic or organic material disposed in the natural free volume of said polymer matrix, wherein said polymer matrix is at least partially amorphous and wherein said inorganic or organic material is an organic macromolecular network having the formula $-(R—R)-_n$, wherein n is an integer from about 1 to about 10,000 and R is a monomer radical.

37. A composite according to claim 36, wherein the organic macromolecular network comprises polyacetylene, polypyrrole, polyaniline, polythiophene, or combinations thereof.

38. A method for making a composite according to claim 1, said method comprising:
providing a polymer matrix having natural free volume therein, wherein the polymer matrix is at least partially amorphous and wherein the polymer matrix comprise a halopolymer;
evacuating the natural free volume of the polymer matrix; and infusing inorganic or organic molecules into the evacuated natural free volume of the polymer matrix.

39. A method according to claim 38 further comprising:
polymerizing the inorganic or organic molecules under conditions effective to assemble the inorganic or organic molecules into macromolecular networks.

40. A method according to claim 39, wherein said polymerizing is carried out photochemically, chemically, or electrochemically.

41. A method according to claim 39, wherein said polymerizing is carried out by oxidizing, hydrolyzing, or hydrogenating the inorganic or organic molecules.

42. A method according to claim 41 wherein the oxidizing, hydrolyzing, or hydrogenating comprises:
exposing the inorganic or organic molecules to a gas comprising water, oxygen, hydrogen, or combination thereof.

43. A method according to claim 42, wherein said polymerizing is carried out by oxidizing or hydrolyzing the inorganic or organic molecules and wherein the gas ia ambient air.

44. A method according to claim 39, wherein the inorganic or organic molecules are inorganic molecules comprising metal atoms and ligands bonded thereto which can be cleaved from the metal atoms by exposure to actinic radiation and wherein said polymerizing comprises:
exposing the inorganic molecules to actinic radiation under conditions effective to cleave the ligands from the metal atoms and
exposing the metal atoms having ligands cleaved therefrom to an oxygen-containing or water-containing gas under conditions effective to cause the metal atoms to assemble into macromolecular networks.

45. A method according to claim 38, wherein the inorganic or organic molecules are pi-allyl compounds of a Group IIIa, IVa, Va, or VIIa metals or a metal selected from the group consisting of Fe, Ru, Os, Co, Rh, Ir, Ni, Pd, or Pt and wherein said polymerizing comprises:

contacting the pi-allyl compounds with hydrogen gas under conditions effective to cause the formation of a conductive metal network.

46. A method according to claim 38, wherein the polymer matrix comprises a functionality selected from the group consisting of a halogen atom, an amine group, an alkene group, an alkyne group, a carbonyl group, an alcohol group, a thiol group, and combinations thereof and wherein said method further comprises:

treating the inorganic or organic molecules under conditions effective to cause the inorganic or organic molecules to interact with the polymer matrix's functionality.

47. A method according to claim 46, wherein the functionality is a halogen atom.

48. A method according to claim 46, wherein the functionality is a fluorine atom.

49. A method according to claim 46, wherein said treating is carried out photochemically, chemically, or electrochemically.

50. A method according to claim 46, wherein said treating comprises oxidizing, hydrolyzing, or hydrogenating the inorganic or organic molecules.

51. A method according to claim 50, wherein the oxidizing, hydrolyzing, or hydrogenating comprises:

exposing the inorganic or organic molecules to a gas comprising water, oxygen, hydrogen, or combination thereof.

52. A method according to claim 51, wherein said treating is carried out by oxidizing of hydrolyzing the inorganic or organic molecules and wherein the gas is ambient air.

53. A method according to claim 46, wherein the inorganic or organic molecules are inorganic molecules comprising metal atoms and ligands bonded thereto which can be cleaved from metal atoms by exposure to actinic radiation and wherein said treating comprises:

exposing the inorganic or organic molecules to actinic radiation under conditions effective to cleave the ligands from the metal atoms and treating the metal atoms having ligands cleaved therefrom photochemically, chemically, electrochemically, or thermally under conditions effective to cause the metal atoms to interact with the polymer matrix's functionality.

54. A method according to claim 38, wherein said infusing is carried out under non-supercritical conditions.

55. A method according to claim 38, wherein the inorganic or organic molecules are infused into natural free volume of the polymer matrix in a gaseous state.

56. A method according to claim 38, wherein said infusing comprises:

vaporizing the inorganic or organic molecules to produce an inorganic or organic molecule vapor; and contacting the polymer matrix with the inorganic or organic molecule vapor.

57. A method according to claim 38, wherein the polymer matrix comprises a fluoropolymer.

58. A method according to claim 38, wherein the polymer matrix has a crystallinity of less than about 99%.

59. A method according to claim 38, wherein the polymer matrix has a glass transition temperature to Tg and a thermal decomposition temperature of Td and wherein said infusing is carried out at a temperature from about Tg–50° C. to about Td and at which the inorganic or organic molecules have a non-zero vapor pressure.

60. A method according to claim 38, wherein the inorganic or organic molecules are selected from the group consisting of $VOCl_3$, $W(CO)_6$, $Fe(CO)_5$, $TiCl_4$, $SiCl_4$, $AlCl_3$, $PCl_3$, $SbCl_5$, $As(C_2H_5)_3$, $Ba(C_3H_7)_2$, borane pyridine and tetrahydrofuran complexes, $Cd(BF_4)_2$, $Ca(OOCCH(C_2H_5)C_4H_9)_2$, cerium (III) 2-ethylhexanoate, cesium 2-ethylhexoxide, chromium (III) naphthenate, $CrO_2Cl_2$, $Co(CO)_3NO$, copper (II) dimethylaminoethoxide, triethylgallium, $GeCl_4$, triethylindium, lead naphthenate, $C_2H_5MgCl$, $(CH_3)_2Hg$, $MoF_6$, $Ni(CO)_4$, $Nb(OC_2H_5)_6$, $HReO_4$, $Ta(OC_2H_5)_5$, $C_5H_5Tl$, $SnCl_4$, pi-allyl compounds of Group IIIa, IVa, Va, VIa, or VIIa metals, pi-allyl compounds of Fe, Ru, Os, Co, Rh, Ir, Ni, Pd, or Pt, and combination thereof.

61. A method of catalyzing a reaction of a reactant comprising:

providing a composite according to claim 1, wherein the inorganic or organic material is suitable for catalyzing the reaction of the reactant; and contacting the composite with the reactant under conditions effective to catalyze the reaction.

62. A method according to claim 61, wherein the reactant is a gaseous reactant.

63. A method according to claim 62, wherein the reactant is $SO_2$ and the inorganic or organic material is an inorganic macromolecular network comprising vanadium.

64. A electroconductive imaging element comprising:

an insulating support;

an electrically-conductive layer overlaying the support, wherein said electrically-conductive layer comprises a composite of claim 1; and a dielectric imaging layer overlaying the electrically-conductive layer.

65. A photographic element comprising:

a substrate;

a light-sensitive layer directly or indirectly disposed on the substrate; and an antistatic layer directly or indirectly disposed on the substrate, wherein the antistatic layer comprises a composite of claim 1.

66. A electrolytic fuel cell comprising:

a composite of claim 1;

an anode in electrical contact with said composite; and a cathode in electrical contact with said composite.

67. A method for shielding a material from electromagnetic radiation emitted from an electromagnetic radiation source comprising:

disposing between the material and the electromagnetic radiation source a composite according to claim 1, wherein the inorganic or organic material comprises a metal.

68. A method for shielding a material from heat or flame source comprising:

disposing between the material and the heat or flame source a composite according to claim 1, wherein the inorganic or organic material is a metal oxide.

69. A method for making a composite according to claim 18, said method comprising:

providing a polymer matrix having natural free volume therein, wherein the polymer matrix is at least partially amorphous and wherein the polymer matrix is an organic polymer matrix;

evacuating the natural free volume of the polymer matrix;

infusing inorganic or organic molecules into the evacuated natural free volume of the polymer matrix; and polymerizing the inorganic or organic molecules under conditions effective to assemble the inorganic or organic molecules into a macromolecular network.

70. A method according to claim 69, wherein said polymerizing is carried out photochemically, chemically, or electrochemically.

71. A method according to claim 69, wherein said polymerizing is carried out by oxidizing, hydrolyzing, or hydrogenating the inorganic or organic molecules.

72. A method according to claim 71, wherein the oxidizing, hydrolyzing, or hydrogenating comprises:

exposing the inorganic or organic molecules to a gas comprising water, oxygen, hydrogen, or combinations thereof.

73. A method according to claim 72, wherein said treating is carried out by oxidizing of hydrolyzing the inorganic or organic molecules and wherein the gas is ambient air.

74. A method according to claim 69, wherein the inorganic or organic molecules are inorganic molecules comprising metal atoms and ligands bonded thereto which can be cleaved from metal atoms by exposure to actinic radiation and wherein said treating comprises:

exposing the inorganic or organic molecules to actinic radiation under conditions effective to cleave the ligands from the metal atoms and exposing the metal atoms having ligands cleaved therefrom to an oxygen-containing or water-containing gas under conditions effective to cause the metal atoms to assemble into macromolecular networks.

75. A method according to claim 69, wherein the inorganic or organic molecules are pi-allyl compounds of a Group IIIa, IVa, Va, or VIIa metals or a metal selected from the group consisting of Fe, Ru, Os, Co, Rh, Ir, Ni, Pd, or Pt and wherein said polymerizing comprises:

contacting the pi-allyl compounds with hydrogen gas under conditions effective to cause the formation of a conductive metal network.

76. A method according to claim 69, wherein said infusing is carried out under non-supercritical conditions.

77. A method according to claim 69, wherein the inorganic or organic molecules are infused into the natural free volume of the polymer matrix in a gaseous state.

78. A method according to claim 69, wherein said infusing comprises:

vaporizing the inorganic or organic molecules to produce an inorganic or organic molecule vapor; and contacting the polymer matrix with the inorganic or organic molecule vapor.

79. A method according to claim 69, wherein the polymer matrix comprises halopolymers, polyimides, polymides, polyalkylenes, poly(phenylenediamine terephthalamide) filaments, polyethyleneterphthalates, modified cellulose derivatives, starch, polyesters, polymethacrylates, polyacrylates, polyvinyl alcohol, copolymers of vinyl alcohol with ethylenically unsaturated monomers, polyvinyl acetate, poly(alkylene oxides), vinyl chloride homopolymers and copolymers, terpolymers of ethylene with carbon monoxide and with an acrylic acid ester or vinyl monomer, polysiloxanes, homopolymers, and copolymers of halodioxoles and substituted dioxoles, polyvinylpyrrolidone, or combination thereof.

80. A method according to claim 69, wherein the polymer matrix comprises a halopolymer.

81. A method according to claim 69, wherein the polymer matrix comprises a fluoropolymer.

82. A method according to claim 69, wherein the polymer matrix has a crystallinity of less than about 99%.

83. A method according to claim 69, wherein the polymer matrix has a glass transition temperature to Tg and a thermal decomposition temperature of Td and wherein said infusing is carried out at a temperature from about Tg–50° C. to about Td and at which the inorganic or organic molecules have a non-zero vapor pressure.

84. A method according to claim 69, wherein the inorganic or organic molecules are selected from the group consisting of $VOCl_3$, $W(CO)_6$, $Fe(CO)_5$, $TiCl_4$, $SiCl_4$, $AlCl_3$, $PCl_3$, $SbCl_5$, $As(C_2H_5)_3$, $Ba(C_3H_7)_2$, borane pyridine and tetrahydrofuran complexes, $Cd(BF_4)_2$, $Ca(OOCCH(C_2H_5)C_4H_9)_2$, cerium (III) 2-ethylhexanoate, cesium 2-ethylhexoxide, chromium (III) naphthenate, $CrO_2Cl_2$, $Co(CO)_3NO$, copper (II) dimethylaminoethoxide, triethylgallium, $GeCl_4$, triethylindium, lead naphthenate, $C_2H_5MgCl$, $(CH_3)_2Hg$, $MoF_6$, $Ni(CO)_4$, $Nb(OC_2H_5)_6$, $HReO_4$, $Ta(OC_2H_5)_5$, $C_5H_5Tl$, $SnCl_4$, pi-allyl compounds of Group IIIa, IVa, Va, VIa, or VIIa metals, pi-allyl compounds of Fe, Ru, Os, Co, Rh, Ir, Ni, Pd, or Pt, and combination thereof.

85. A method of catalyzing a reaction of a reactant comprising:

providing a composite according to claim 18, wherein the inorganic or organic material is suitable for catalyzing the reaction of reactant; and contacting the composite with the reactant under conditions effective to catalyze the reaction.

86. A method according to claim 85, wherein the reactant is a gaseous reactant.

87. A method according to claim 85, wherein the reactant is $SO_2$ and the inorganic or organic material is an inorganic macromolecular network comprising vanadium.

88. A electroconductive imaging element comprising:

an insulating support;

an electrically-conductive layer overlaying the support, wherein said electrically-conductive layer comprises a composite of claim 18; and a dielectric imaging layer overlaying the electrically-conductive layer.

89. A photographic element comprising:

a substrate;

a light-sensitive layer directly or indirectly disposed on the substrate; and an antistatic layer directly or indirectly disposed on the substrate, wherein the antistatic layer comprises a composite of claim 18.

90. A electrolytic fuel cell comprising:

a composite of claim 18;

an anode in electrical contact with said composite; and a cathode in electrical contact with said composite.

91. A method for shielding a material from electromagnetic radiation emitted from an electromagnetic radiation source comprising:

disposing between the material and the electromagnetic radiation source a composite according to claim 18, wherein the inorganic or organic material comprises a metal.

92. A method for shielding a material from heat or flame source comprising:

disposing between the material and the heat or flame source a composite according to claim 18, wherein the inorganic or organic material is a metal oxide.

93. A method for making a composite according to claim 36, said method comprising:

providing a polymer matrix having natural free volume therein, wherein the polymer matrix is at least partially amorphous;

evacuating the natural free volume of the polymer matrix;

infusing organic molecules into the evacuated natural free volume of the polymer matrix; and polymerizing the organic molecules under conditions effective to assemble the organic molecules into the organic macromolecular network having the formula $-(R-R)_n-$, wherein n is an integer from about 1 to about 10,000 and R is a monomer radical.

94. A method according to claim 93, wherein said infusing is carried out under non-supercritical conditions.

95. A method according to claim 93, wherein the organic molecules are infused into the natural free volume of the polymer matrix in a gaseous state.

96. A method according to claim 93, wherein the polymer matrix comprises a halopolymer.

97. A method according to claim 93, wherein the polymer matrix comprises a fluoropolymer.

98. A method according to claim 93, wherein the organic molecules are selected from the group consisting of acetylene, pyrrole, aniline, thiophene, and combinations thereof.

* * * * *